(12) United States Patent
Fukui et al.

(10) Patent No.: US 10,527,283 B2
(45) Date of Patent: Jan. 7, 2020

(54) BURNER TILE, BURNER, AND FURNACE

(71) Applicants: MITSUBISHI CHEMICAL CORPORATION, Chiyoda-ku (JP); CHUGAI RO CO., LTD., Osaka-shi (JP)

(72) Inventors: Tsuyoshi Fukui, Joetsu (JP); Mitsuo Suzuki, Chiyoda-ku (JP); Shunsuke Yamamoto, Osaka (JP); Takeshi Oohashi, Osaka (JP); Kensuke Kawabata, Osaka (JP)

(73) Assignees: MITSUBISHI CHEMICAL CORPORATION, Chiyoda-ku (JP); CHUGAI RO CO., LTD., Osaka-shi (JP)

( * ) Notice: Subject to any disclaimer, the term of this patent is extended or adjusted under 35 U.S.C. 154(b) by 472 days.

(21) Appl. No.: 15/114,582

(22) PCT Filed: Jan. 29, 2015

(86) PCT No.: PCT/JP2015/052463
§ 371 (c)(1),
(2) Date: Jul. 27, 2016

(87) PCT Pub. No.: WO2015/122281
PCT Pub. Date: Aug. 20, 2015

(65) Prior Publication Data
US 2016/0348905 A1    Dec. 1, 2016

(30) Foreign Application Priority Data

Feb. 12, 2014   (JP) .................................. 2014-024487
Jan. 7, 2015    (JP) .................................. 2015-001634

(51) Int. Cl.
*F23M 5/02*    (2006.01)
*F23D 14/58*   (2006.01)

(52) U.S. Cl.
CPC ............. *F23M 5/025* (2013.01); *F23D 14/58* (2013.01)

(58) Field of Classification Search
CPC ....... F27D 1/002; F27D 1/0009; F23M 5/025; B32B 18/00; B32B 2262/10; F23D 14/58
See application file for complete search history.

(56) References Cited

U.S. PATENT DOCUMENTS 3,346,016 A * 10/1967 Blau ..................... F16L 59/029
                                                    138/138
3,528,400 A *  9/1970 Norwalk ................. F23R 3/007
                                                    126/144
(Continued)

FOREIGN PATENT DOCUMENTS

CN        1452711 A      10/2003
CN      201463564 U       5/2010
(Continued)

OTHER PUBLICATIONS

Combined Office Action and Search Report dated Apr. 12, 2018 in Taiwanese Patent Application No. 104104617 with English translation of categories of cited documents, 9 pages.
(Continued)

*Primary Examiner* — Avinash A Savani
*Assistant Examiner* — Aaron H Heyamoto
(74) *Attorney, Agent, or Firm* — Oblon, McClelland, Maier & Neustadt, L.L.P.

(57) ABSTRACT

Provided is a burner tile that has good fire resistance, good heat resistance, good erosion resistance, and good thermal shock resistance. A burner tile 1E includes a molded inorganic fiber product and has a burner main hole 3E. The burner tile 1E includes an inner layer 120 including a combination of inorganic fiber rods 121 and 122 such that the inner layer 120 defines an inner circumferential surface of the main hole 3E, and an outer layer 130 formed by
(Continued)

surrounding an outer circumferential surface of the inner layer 120 with the molded inorganic fiber product. Part of the burner tile 1E extending along the inner circumferential surface of the main hole 3E has a high bulk density achieved by highly concentrating an inorganic binder in the inorganic fiber in part including the inner circumferential surface.

19 Claims, 17 Drawing Sheets

(56) References Cited

U.S. PATENT DOCUMENTS

| | | | | |
|---|---|---|---|---|
| 4,580,969 | A * | 4/1986 | Brachet | F27D 1/002 |
| | | | | 431/171 |
| 4,800,054 | A * | 1/1989 | Roestenberg | B29C 33/307 |
| | | | | 156/94 |
| 5,088,423 | A | 2/1992 | Ogura et al. | |
| 5,348,468 | A * | 9/1994 | Graf | F23D 14/16 |
| | | | | 431/171 |
| 2014/0186599 | A1* | 7/2014 | Fukui | F27D 1/0006 |
| | | | | 428/218 |
| 2014/0272363 | A1* | 9/2014 | Hata | D04H 1/46 |
| | | | | 428/219 |
| 2016/0258621 | A1* | 9/2016 | Schalles | F23M 5/025 |

FOREIGN PATENT DOCUMENTS

| | | | |
|---|---|---|---|
| JP | 61-59113 A | 3/1986 | |
| JP | 1-150712 A | 6/1989 | |
| JP | 3-121336 U | 12/1991 | |
| JP | 5-39918 A | 2/1993 | |
| JP | 6-281132 A | 10/1994 | |
| JP | 06281132 A * | 10/1994 | |
| JP | 7-69051 B2 | 7/1995 | |
| JP | 9-264528 A | 10/1997 | |
| JP | 09264528 A * | 10/1997 | |
| JP | H09264528 A * | 10/1997 | ............... F23M 5/00 |
| JP | 10-205715 A | 8/1998 | |
| JP | 2000-9305 A | 1/2000 | |
| JP | 2000-193232 A | 7/2000 | |
| JP | 2002-295805 A | 10/2002 | |
| JP | 2002295805 A * | 10/2002 | |
| JP | 2008-190761 A | 8/2008 | |
| JP | 2011-208344 A | 10/2011 | |
| WO | 2013/035645 A1 | 3/2013 | |

OTHER PUBLICATIONS

Combined Office Action and Search Report dated Jun. 2, 2017 in Chinese Patent Application No. 201580005162.7 (with English translation).

International Search Report dated Apr. 21, 2015 in PCT/JP2015/052463 Filed Jan. 29, 2015.

Extended European Search Report dated Oct. 6, 2017 in Patent Application No. 15748689.5.

Extended European Search Report dated Oct. 10, 2018 in Patent Application No. 18166516.7, 7 pages.

* cited by examiner

BURNER TILE, BURNER, AND FURNACE

FIELD OF INVENTION

The present invention relates to a burner tile for mounting a burner, and in particular, relates to a burner tile including a molded inorganic fiber product. The present invention further relates to a burner including the burner tile and a furnace including the burner.

BACKGROUND OF INVENTION

A burner tile, functioning as a refractory member, surrounds a burner attached to a roof or a side wall of, for example, a reheating furnace or a heat treatment furnace. Examples of widely used burner tiles include a rammed and molded product made of a plastic refractory material and a casted and molded product made of a castable material. For the rammed and molded product made of a plastic refractory material, high skill is required in molding. In some cases, the casted and molded product made of a castable material may explode due to insufficient drying. Furthermore, the burner tile suffers from severe thermal shock caused by heavy switching between burning and extinguishing operations of the burner. Disadvantageously, the burner tile tends to crack or peel off.

In recent years, the use of burner tiles made of ceramic fiber resistant to thermal shock has been being increased.

Patent Literature 1 discloses a ceramic fiber burner tile constructed such that ceramic fiber blankets are laminated in a cross, radial, or mosaic pattern and ends of fibers of the ceramic fiber blankets face a divergent or cylindrical burner attachment hole that extends axially through the burner tile and increases in diameter toward a furnace interior.

Patent Literature 2 discloses a burner tile including a refractory material and an inorganic fiber cloth such that the inorganic fiber cloth is rolled.

Patent Literature 3 discloses a molded inorganic fiber product fabricated by impregnating a needled inorganic fiber blanket with an inorganic sol and drying the blanket. The molded inorganic fiber product has a bulk density of 0.08 to 0.20 g/cm$^3$. Patent Literature 3 describes the use of this product as a heat insulator for a burner tile, for example.

Patent Literature 4 discloses a molded inorganic fiber product that includes inorganic fiber and inorganic binder particles and has at least one combination of a high fiber density region and a low fiber density region. The ratio of the binder particle content in the high fiber density region to that in the low fiber density region is 0.5:1 to 5:1. The number-average particle diameter of the inorganic binder particles is 20 to 35 μm and the number of inorganic binder particles is less than 15 in the outermost surface of the molded product.

Patent Literature 5 discloses a burner tile that includes an enclosure made of a heat-resistant material, a molded inorganic fiber blanket compressed in a cavity in the enclosure, and a liner member retained by restoring force of the molded inorganic fiber blanket.

Patent Literature 6 discloses a burner tile that includes a plurality of ceramic fiber blankets laminated, a combustion cylindrical hole extending perpendicular to a laminating direction of the blankets and having a divergent longitudinal sectional shape such that the cylindrical hole increases in diameter toward one end thereof, and molded fiber products arranged on both sides of the burner tile in the laminating direction. The molded fiber products are made by compressing and combining ceramic fiber with a binder.

Patent Literature 7 discloses a burner tile that includes continuous layers of inorganic fiber blankets forming an inner circumferential surface to be in contact with a furnace core. The continuous layers are next to one another in a plane perpendicular to the axis of a main hole for a burner, and increase in their bulk density toward the axis.

Patent Literature 1: Japanese Patent Publication H6-281132A

Patent Literature 2: Japanese Patent Publication H9-264528A

Patent Literature 3: Japanese Patent Publication 2011-208344A

Patent Literature 4: International Publication WO 2013/035645

Patent Literature 5: Japanese Patent Publication 2000-9305A

Patent Literature 6: Japanese Patent Publication H7-69051B

Patent Literature 7: Japanese Patent Publication S61-59113A

To ensure contact and mixing of a fuel emitted from a burner with combustion air under high velocity conditions and achieve high temperature combustion, burner tiles are required to have high fire resistance, high heat resistance, high erosion resistance, high thermal shock resistance, and uniform thermal conductivity.

The burner the disclosed in Patent Literature 1 includes ceramic fiber. Velocities exceeding approximately 35 m/s increase the amount of fibers scattering. This burner the can hardly withstand high velocities above 100 m/s. It is difficult to ensure sufficient stirring in a furnace with a flame emitted from a burner at a high velocity.

The burner tile disclosed in Patent Literature 2 is heavy and exhibits poor handling because its material matrix is a castable material, and further requires preheating to prevent cracks. Since this burner tile is produced by cast molding, spare parts cannot be provided. Disadvantageously, the burner tile still has disadvantages in that the burner tile requires a long period for reconstruction and replacement when broken.

Furthermore, this burner tile includes only one blanket having a single needling density, and thus has disadvantages in terms of moldability and properties. Specifically, a high-needling-density blanket having high resilience may create difficulty in achieving highly accurate molding for making a product having a shape that may result in large strain, for example, a block-shaped product. A low-needling-density blanket may degrade the properties, such as erosion resistance, of the burner tile.

The burner tile disclosed in Patent Literature 3 has disadvantages in that delamination tends to occur when a laminated structure is formed.

In the burner tile disclosed in Patent Literature 4, the number of inorganic binder particles in the outermost surface of the molded product is small, less than 15. Disadvantageously, it is difficult to maintain the outside shape of a final product produced by molding a needled blanket having high resilience into a block shape.

In the burner tile disclosed in Patent Literature 5, the liner member, which includes heat resistant long fiber, heat resistant powder, and aluminum phosphate, is thin. Disadvantageously, the heat resistance cannot be maintained for a long term.

The burner tile disclosed in Patent Literature 6 includes the simple laminate of ceramic fiber blankets bonded with a silica sol. Shrinkage of the ceramic fiber blankets may form a clearance between the ceramic fiber blankets, and the clearance may serve as a heat bridge.

In the burner tile disclosed in Patent Literature 7, the superposed surfaces of ceramic fiber blankets laminated radially in an orifice tube may serve as heat bridges.

SUMMARY OF INVENTION

An object of the present invention is to provide a burner tile that has good fire resistance, heat resistance, erosion resistance, and thermal shock resistance. Another object of the present invention is to provide a burner including the burner tile and a furnace including the burner.

A first invention provides a burner tile including a molded inorganic fiber product, having a burner main hole extending therethrough in a furnace interior-exterior direction, and further including an inner layer surrounding the main hole and an outer layer surrounding an outer circumferential surface of the inner layer. The inner layer and the outer layer are included in at least part of the burner tile adjacent to a furnace interior. The inner layer includes inorganic fiber rods arranged and combined such that end surfaces of the rods extend substantially radially from the main hole. The outer layer includes an inorganic fiber blanket wrapped several turns around the outer circumferential surface of the inner layer.

A second invention provides a burner tile including a molded inorganic fiber product, having a burner main hole extending therethrough in a furnace interior-exterior direction, and further including high bulk density part that extends along an inner circumferential surface of the main hole and has a higher bulk density than intermediate part located between the inner circumferential surface and an outer surface of the burner tile.

A burner according to the present invention includes the burner tile according to the first or second invention. A furnace according to the present invention includes the burner tile.

The burner tile according to each of the first invention and the second invention may be composed of a cylindrical member fitted in part of an inner circumferential surface of the main hole adjacent to the furnace interior and a main body in which the cylindrical member is detachably fitted. The burner tile may further include anti-separating means for preventing the cylindrical member from separating from the main body and moving toward the furnace interior.

The burner tile according to the first invention can be made by a method including: an arranging step of arranging the inorganic fiber rods on at least part of a core mold having the shape of the main hole adjacent to the furnace interior such that the end surfaces of the rods extend radially; a wrapping step of wrapping an inorganic fiber laminate around at least outer surfaces of the rods to form an inorganic fiber roll; a compressing step of pressing shaping plates against the inorganic fiber roll toward the center of the roll to compress the roll, and coupling the shaping plates to the core mold to maintain the compressed inorganic fiber roll as a compressed product; an impregnating step of impregnating the compressed product in an inorganic-binder-containing liquid; a drying step of drying the compressed product impregnated with the inorganic-binder-containing liquid; a releasing step of removing the core mold and the shaping plates from the dried compressed product; and a firing step of firing the compressed product after removal.

Furthermore, the burner tile according to the first invention can be made by a method of fitting the inner layer into the outer layer. The inner layer can be made by a method including: an arranging step of arranging the inorganic fiber rods on at least part of a core mold having the shape of the main hole adjacent to the furnace interior such that the end surfaces of the rods extend radially; a wrapping step of wrapping an inorganic fiber laminate around at least outer surfaces of the rods to form an inorganic fiber roll; an impregnating step of impregnating the inorganic fiber roll with an inorganic-binder-containing liquid; a drying step of drying the inorganic fiber roll impregnated with the inorganic-binder-containing liquid; and a firing step of firing the dried inorganic fiber roll. The outer layer can be made by a method including: a wrapping step of wrapping an inorganic fiber laminate around an outer circumferential surface of a core mold having the shape of the inner layer to form an inorganic fiber roll; a compressing step of pressing shaping plates against the inorganic fiber roll toward the center of the roll to compress the roll, and coupling the shaping plates to the core mold to maintain the compressed inorganic fiber roll as a compressed product; an impregnating step of impregnating the compressed product with an inorganic-binder-containing liquid; a drying step of drying the compressed product impregnated with the inorganic-binder-containing liquid; a releasing step of removing the core mold and the shaping plates from the dried compressed product; and firing the compressed product after removal.

The burner tile according to the second invention can be made by a method including: a wrapping step of wrapping an inorganic fiber laminate around an outer circumferential surface of a core mold having the shape of the main hole to form an inorganic fiber roll; a compressing step of pressing shaping plates against the inorganic fiber roll toward the center of the roll to compress the roll, and coupling the shaping plates to the core mold to maintain the compressed inorganic fiber roll as a compressed product; an impregnating step of impregnating the compressed product with an inorganic-binder-containing liquid; a drying step of drying the compressed product impregnated with the inorganic-binder-containing liquid; a releasing step of removing the core mold and the shaping plates from the dried compressed product; and firing the compressed product after removal.

Furthermore, the burner tile according to the second invention can be made by a method of fitting an inner layer into an outer layer. The inner layer can be made by a method including: a wrapping step of wrapping an inorganic fiber laminate around an outer circumferential surface of a core mold having the shape of the main hole to form an inorganic fiber roll; an impregnating step of impregnating the inorganic fiber roll with an inorganic-binder-containing liquid; a drying step of drying the inorganic binder roll impregnated with the inorganic-binder-containing liquid; and firing the dried inorganic fiber roll. The outer layer can be made by a method including: a wrapping step of wrapping an inorganic fiber laminate around an outer circumferential surface of a core mold having the shape of the inner layer to form an inorganic fiber roll; a compressing step of pressing shaping plates against the inorganic fiber roll toward the center of the roll to compress the roll, and coupling the shaping plates to the core mold to maintain the compressed inorganic fiber roll as a compressed product; an impregnating step of impregnating the compressed product with an inorganic-binder-containing liquid; a drying step of drying the compressed product impregnated with the inorganic-binder-containing liquid; a releasing step of removing the core mold and the shaping plates from the dried compressed product; and firing the compressed product after removal.

ADVANTAGEOUS EFFECTS OF INVENTION

Since the burner tile according to the present invention includes the inorganic fiber, the burner the has good fire resistance, heat resistance, and thermal shock resistance, and uniform thermal conductivity. Since the inorganic fiber is a matrix material, the burner tile lightweight and easy to handle, and requires no preheating for temperature elevation. Furthermore, the burner tile requires no in-situ casting and can have spare parts, thus contributing to shortening the period of construction. The burner according to the present invention includes the burner tile. The furnace according to the present invention includes the burner tile.

In the burner tile according to the first invention, the inner circumferential surface of the main hole is defined by the inner layer including the combination of the inorganic fiber rods arranged such that the end surfaces of the rods extend radially from the main hole, and the inner layer is surrounded by the outer layer. Consequently, the inner layer can be prevented from separating or falling if the crystallization of the inorganic fiber included in the inner layer progresses over time. In addition, forming the high bulk density part along the inner circumferential surface of the main hole improves the erosion resistance of the inner circumferential surface of the main hole.

The burner tile according to the second invention includes the high bulk density part extending along the inner circumferential surface of the main hole, and thus has excellent erosion resistance in the inner circumferential surface of the main hole.

In addition, an outer circumferential surface of the inner layer is surrounded with the outer layer formed by rolling an inorganic fiber blanket several turns, thus sealing the interfaces between the inorganic fiber rods included in the inner layer, leading to excellent heat insulating properties.

BRIEF DESCRIPTION OF DRAWINGS

FIG. 6a is a longitudinal sectional view of a core mold and FIG. 6b is a plan view of the core mold as viewed in the direction of arrows VIb-VIb in FIG. 6a.

FIG. 18a is a sectional view of a burner tile according to another embodiment and FIG. 18b is a cross-sectional view taken along line XVIIIb-XVIIIb in FIG. 18a.

FIG. 22a is a longitudinal sectional view of a core mold and FIG. 22b is a plan view of the core mold taken along line XXIIb-XXIIb in FIG. 22a.

DESCRIPTION OF EMBODIMENTS

Embodiments of the present invention will be described in detail below. The following description sets forth exemplary embodiments of the present invention. The present invention is not limited to the details of these embodiments unless they depart from the spirit and scope of the invention.

An example of a burner tile according to a second invention will now be described with reference to FIGS. 1 to 5. As illustrated in FIGS. 1 to 4, a burner tile 1 includes a main body 2 formed of a molded inorganic fiber product, and has a main hole 3 extending through the main body 2. The main hole 3 receives the tip of a burner. The main hole 3 has a tapered shape such that the main hole 3 gradually increases in diameter toward the right of FIG. 2. The shape of the main hole 3 is not limited to this example.

Figure 4:
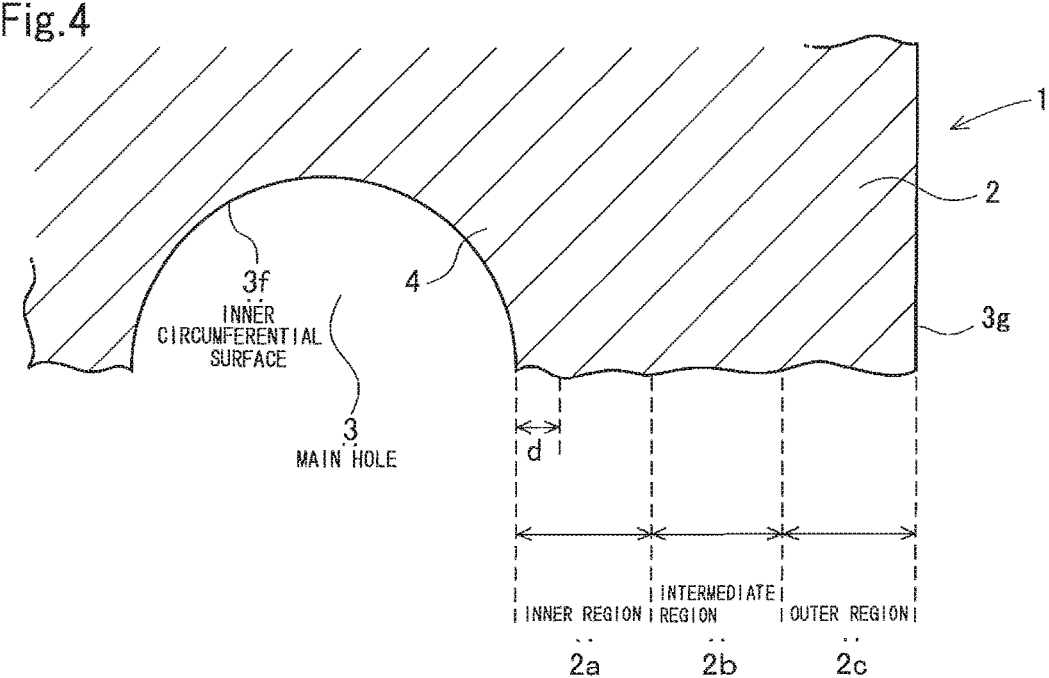
FIG. 4 is a cross-sectional view explaining an inner region, an intermediate region, and an outer region of the burner tile.

As illustrated in FIG. 4, the main body 2 includes high bulk density part 4 that has a high bulk density and extends along an inner circumferential surface 3f of the main hole 3. The burner tile 1 is made by molding an inorganic fiber aggregate into a shape for burner tile, fixing an inorganic binder to the molded product, drying the product, and then firing the product. Highly concentrating the inorganic binder in part extending along the inner circumferential surface 3f of the main hole forms the high bulk density part 4 along the inner circumferential surface 3f.

Figure 5:
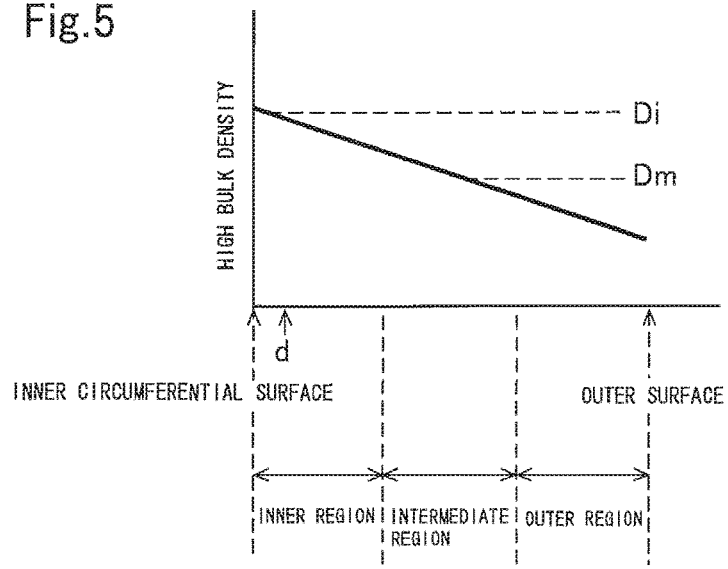
FIG. 5 is a graph illustrating an example of the distribution of bulk density of the burner tile.
Figure 6A:
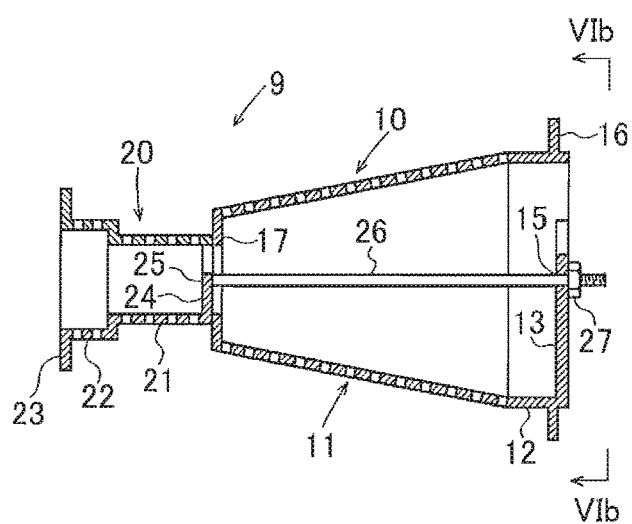
Figure 6B:
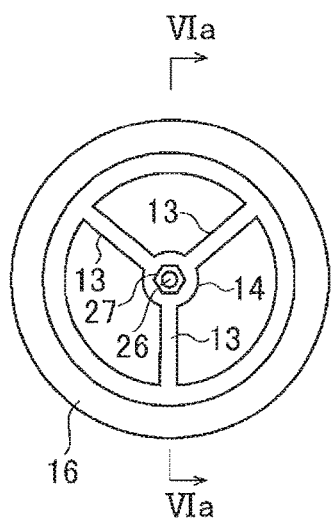

In this embodiment, as illustrated in FIGS. 4 and 5, when the main body 2 is equally divided into three regions arranged concentrically about the axis of the main hole 3: an inner region 2a corresponding to the innermost third part closest to the main hole 3, an outer region 2c corresponding to the outermost third part, and an intermediate region 2b corresponding to the intermediate third part between the regions 2a and 2c, Di is greater than Dm where Di denotes the bulk density of part in the inner region 2a extending from the inner circumferential surface 3f of the main hole to a depth d=5 mm in the thickness direction, and Dm denotes the bulk density in the intermediate region 2b.

Di may have any value greater than Dm. Di is typically greater than or equal to 0.3 g/cm$^3$, preferably greater than or equal to 0.4 g/cm$^3$, and is less than or equal to 3.0 g/cm$^3$, preferably less than or equal to 2.0 g/cm$^3$, more preferably less than or equal to 1.0 g/cm$^3$, most preferably less than or equal to 0.8 g/cm$^3$.

Dm may have any value less than Di. Dm is typically greater than or equal to 0.1 g/cm$^3$, preferably greater than or equal to 0.15 g/cm$^3$, most preferably greater than or equal to 0.2 g/cm$^3$, and is less than or equal to 2.0 g/cm$^3$, preferably less than or equal to 1.0 g/cm$^3$, more preferably less than or equal to 0.5 g/cm$^3$, most preferably less than or equal to 0.3 g/cm$^3$.

The intermediate region 2b preferably includes a plurality of inorganic-binder-impregnated inorganic fiber aggregate layers having different bulk densities, more preferably has a laminated structure including a laminate of an inorganic-binder-impregnated inorganic fiber aggregate layer having a bulk density of 0.10 to 0.18 g/cm$^3$ and an inorganic-binder-impregnated inorganic fiber aggregate layer having a bulk density of 0.19 to 0.25 g/cm$^3$, most preferably includes a series of the above-described laminates.

Di-Dm is preferably greater than or equal to 0.05 g/cm$^3$, more preferably greater than or equal to 0.10 g/cm$^3$, most preferably greater than or equal to 0.15 g/cm$^3$. Furthermore, Di-Dm is preferably less than or equal to 3.0 g/cm$^3$, more preferably less than or equal to 2.0 g/cm$^3$, most preferably less than or equal to 1.0 g/cm$^3$. Dm/Di is preferably 0.1 to 0.9, more preferably 0.2 to 0.8.

Figure 14:
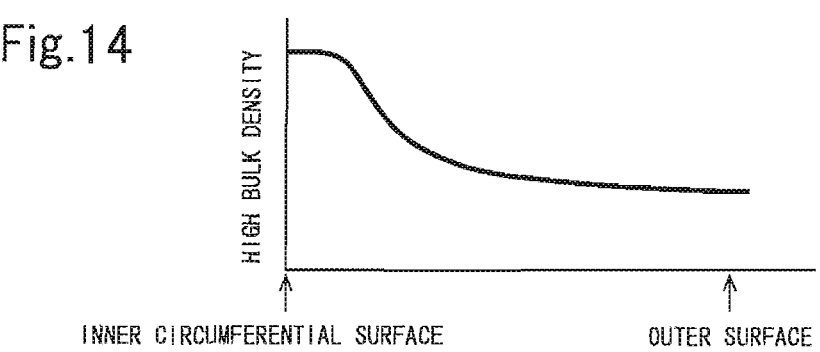
FIG. 14 is a graph illustrating another example of the distribution of bulk density of the burner tile.

Although the bulk density linearly decreases from the inner circumferential surface 3f toward an outer surface as illustrated in FIG. 5, a change in bulk density is not limited to this example. For example, as illustrated in FIG. 14, the bulk density may relatively sharply decrease from the inner circumferential surface to the intermediate region and then gradually decrease from the intermediate region to the outer surface.

Figure 15:
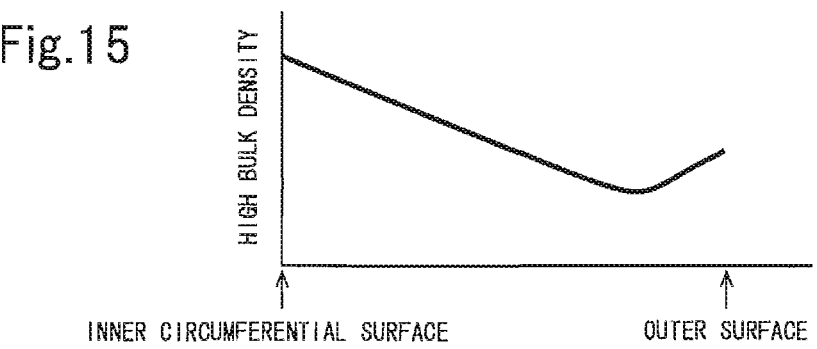
FIG. 15 is a graph illustrating another example of the distribution of bulk density of the burner tile.

The burner tile according to the present invention may increase in bulk density toward the outer surface as illustrated in FIG. 15. Increased bulk densities of part including the outer surface reduce deformation caused by touching the outer surface of the burner tile. This allows easy handling of the burner tile. Let $D_o$ denote the bulk density of part in the outer region 2c extending from an outer surface 3g to a depth h=5 mm in the thickness direction. $D_o$ is not limited to any particular range of values. $D_o$ is typically greater than or equal to 0.1 g/cm$^3$, preferably greater than or equal to 0.3 g/cm$^3$, and is less than or equal to 3.0 g/cm$^3$, preferably less than or equal to 2.0 g/cm$^3$, more preferably less than or equal to 1.0 cm$^3$, most preferably less than or equal to 0.5 g/cm$^3$.

Since the burner tile 1 includes the high bulk density part 4 extending along the inner circumferential surface 3f of the main hole, the burner tile 1 exhibits excellent erosion resistance. In addition, since the burner tile 1 has low bulk densities in the intermediate region 2b, the burner tile 1 is lightweight and exhibits excellent thermal shock resistance.

Preferably, the burner tile includes a molded rolled inorganic fiber product including a plurality of inorganic-binder-impregnated inorganic fiber aggregate layers having different bulk densities to achieve uniform thermal conductivity, as well as to enhance both erosion resistance and shock absorbance.

Figure 18A:
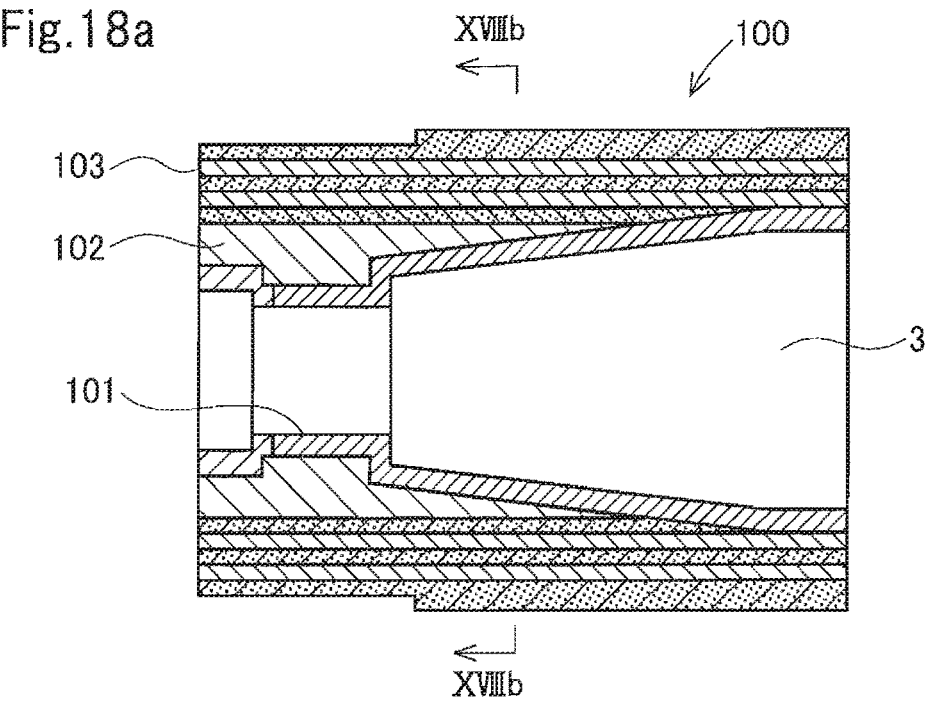
Figure 18B:
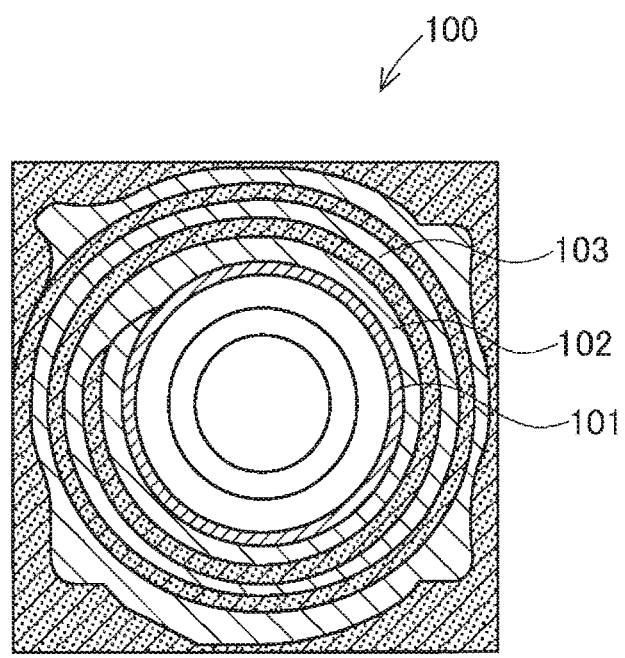

As illustrated in FIGS. 18a and 18b, a burner tile 100 preferably includes an inorganic-binder-impregnated inorganic fiber aggregate layer 101 having a bulk density greater than 0.25 g/cm$^3$ and an inorganic-binder-impregnated inorganic fiber aggregate layer 102 having a bulk density ranging from 0.19 to 0.25 g/cm$^3$. More preferably, the burner tile 100 further includes an inorganic-binder-impregnated inorganic fiber aggregate layer 103 having a bulk density ranging from 0.10 g/cm$^3$ to 0.18 g/cm$^3$. The molded inorganic fiber product including the inorganic binder is preferred because including the inorganic binder enhances fire resistance, heat resistance, erosion resistance, and thermal shock resistance.

An exemplary method of making the burner tile 1 will now be described with reference to FIGS. 6 to 10 FIG. 6a is an axially longitudinal sectional view of a core mold 9, which is used to mold the burner tile 1, taken along line VIa-VIa in FIG. 6b. FIG. 6b is a plan view of the core mold 9 as viewed in the direction of arrows VIb-VIb in FIG. 6a.

The core mold 9 includes a front part 10 and a rear part 20 fastened to the front part 10. The front part 10 is cylindrical and is formed of a perforated plate having many small holes. The front part 10 includes a tapered portion 11 that increases in diameter toward its front end, a cylindrical portion 12 connecting to the front end of the tapered portion 11, a plurality of (in this embodiment, three) spokes 13 radially arranged at a front end of the cylindrical portion 12, a boss 14 connecting to inner ends of the radially extending spokes 13, a bolt insertion hole 15 extending through the boss 14, a flange 16 extending from an outer circumferential surface of the cylindrical portion 12, and an inwardly extending collar 17 extending inwardly from a rear end of the tapered portion 11.

The rear part 20 is cylindrical and is formed of perforated plate having many small holes. The rear part 20 includes a first cylindrical portion 21 having a small diameter, a second cylindrical portion 22 having a large diameter and connecting to a rear end of the first cylindrical portion 21, a flange 23 extending from an outer circumferential surface of a rear end of the second cylindrical portion 22, a plurality of spokes 24 radially arranged at a front end of the first cylindrical portion 21, a boss 25 connecting to inner ends of the radially extending spokes 24, and a long bolt 26 extending from the boss 25 axially through the front part 10.

The first cylindrical portion 21 of the rear part 20 is come into contact with the inwardly extending collar 17 of the front part 10. A free end of the long bolt 26 is inserted into the bolt insertion hole 15. A nut 27 is screwed and tightened onto the free end of the long bolt 26, thus fastening and integrating the front part 10 and the rear part 20 into the core mold 9, which is substantially cylindrical. The parts 10 and 20 are preferably made of metal or plastic, more preferably metal.

Figure 7:
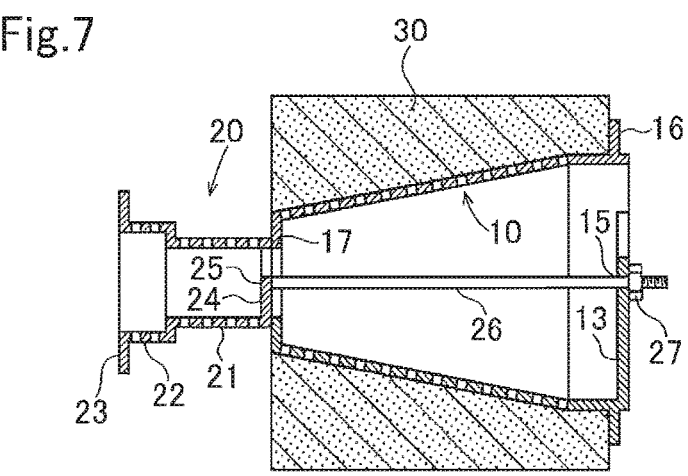
FIG. 7 is a sectional view explaining a method of making the burner tile.
Figure 8:
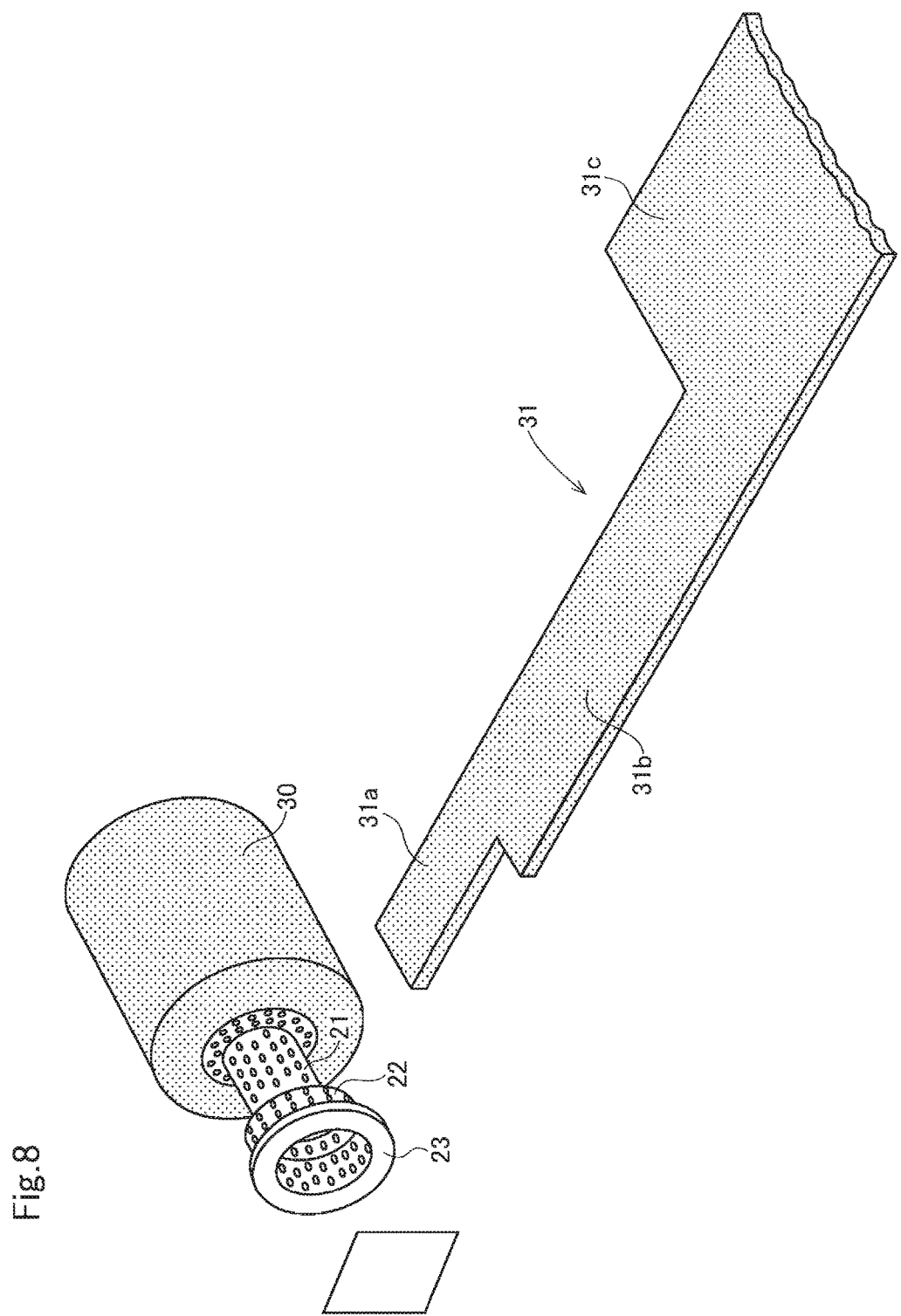
FIG. 8 is a perspective view explaining the method of making the burner tile.

An outer circumferential surface of the core mold 9 is wrapped with a mold release sheet (not illustrated) made of, for example, glass cloth. After that, the outer circumferential surface of the front part 10 is wrapped with a first inorganic fiber laminate 30. The tapered portion 11 is wrapped with a sector-shaped cut-out inorganic fiber laminate and then covered with three band-shaped rectangular inorganic fiber laminates such that the three laminates extend longitudinally along the surface of the tapered portion. The cylindrical portion 12 is wrapped with a band-shaped rectangular inorganic fiber laminate. The tapered portion 11 and the cylindrical portion 12 are further wrapped with a band-shaped inorganic fiber laminate. As illustrated in FIGS. 7 and 8, it is preferred that the inorganic fiber laminate 30, serving as a roll, having an outer circumferential surface be concentric with the front part 10.

Then, an outer circumferential surface of the rear part 20 and the outer circumferential surface of the roll of the inorganic fiber laminate 30 are wrapped with a second inorganic fiber laminate 31 made of inorganic fiber, as illustrated in FIG. 8. The second inorganic fiber laminate 31 includes a narrow-width portion 31a, serving as a leading portion, an intermediate-width portion 31b that follows the narrow-width portion 31a, and a full-width portion 31c that follows the intermediate-width portion 31b.

The inorganic fiber laminate 30 may be a combination of two or more inorganic fiber blankets having different densities superposed on one another.

The narrow-width portion 31a has a width that is the same as the axial length of the first cylindrical portion 21. The intermediate-width portion 31b has a width that is the same as the sum of the axial lengths of the first and second cylindrical portions 21 and 22. The full-width portion 31c has a width that is the same as the distance between the flanges 16 and 23.

Figure 9:
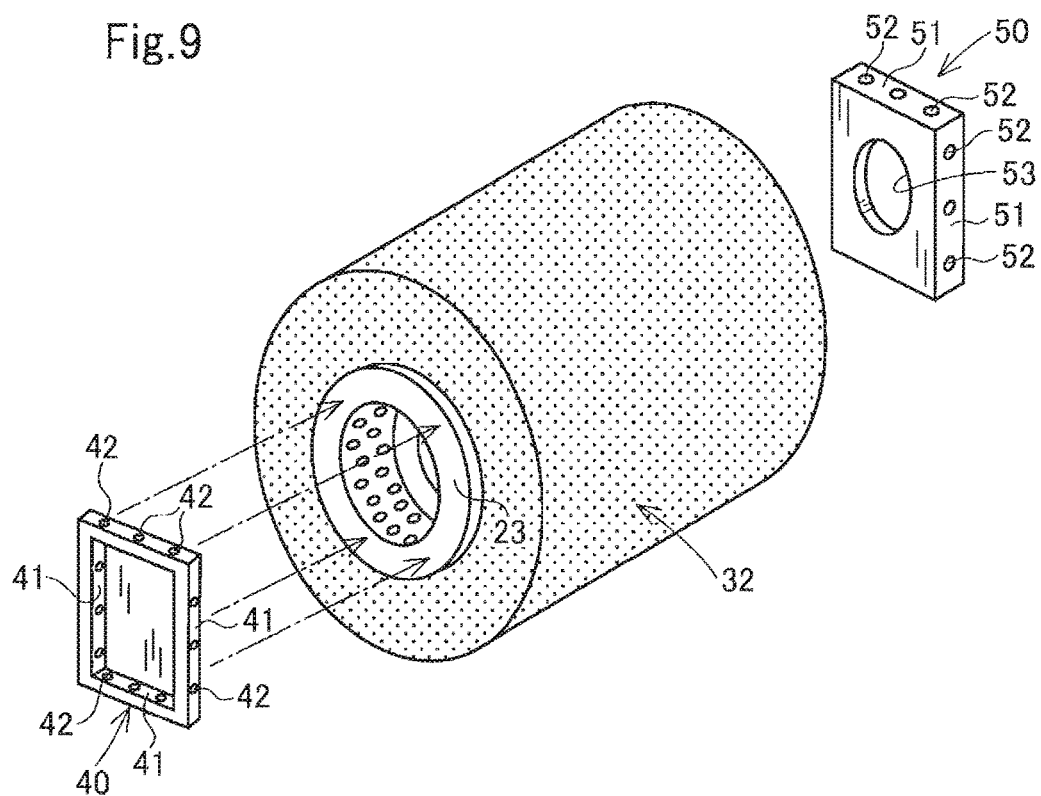
FIG. 9 is a perspective view explaining the method of making the burner tile.
Figure 10:
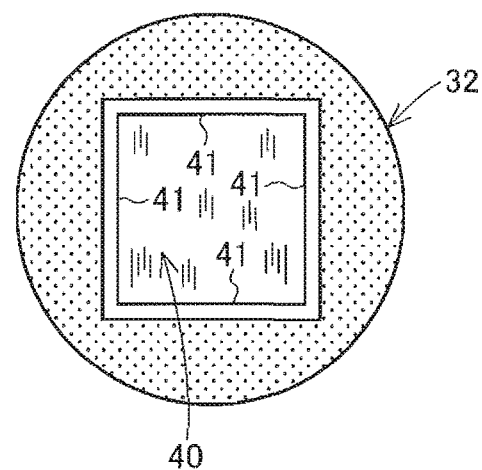
FIG. 10 is a side view of a roll.

When the narrow-width portion 31a is wrapped around the first cylindrical portion 21, a roll of the narrow-width portion 31a has substantially the same diameter as that of the second cylindrical portion 22. Then, the intermediate-width portion 31b is wrapped around the rolled narrow-width portion 31a and the second cylindrical portion 22 such that the intermediate-width portion 31b extends over an outer circumferential surface of the intermediate-width portion 31b and that of the second cylindrical portion 22. A roll of the intermediate-width portion 31b has substantially the same diameter as that of the roll of the first inorganic fiber laminate 30. After that, the full-width portion 31c is wrapped around the roll of the intermediate-width portion 31b and the roll of the inorganic fiber laminate 30 such that the full-width portion 31c extends over outer circumferential surfaces of these rolls, thus forming a roll 32 as illustrated in FIGS. 9 and 10.

It is preferred that a porous adhesive sheet (not illustrated) be wrapped around an outer circumferential surface of the roll 32 to maintain the shape of the roll 32. End plates 50 and 40 are attached to the flanges 16 and 23 of the core mold 9 with the roll 32 using bolts (not illustrated), respectively. The end plates 40 and 50 are square plate-shaped members. The end plate 40 includes a rib 41 extending outwardly from four edges of the plate. The end plate 50 includes a rib 51 extending outwardly from four edges of the plate. The rib 41 has small holes 42 arranged parallel to the surface of the plate. The rib 51 has small holes 52 arranged parallel to the surface of the plate. The end plate 50 has a circular opening 53 having substantially the same diameter as an inside diameter of the cylindrical portion 12 of the core mold 9.

After the end plates 40 and 50 are attached to the core mold 9, the roll 32 is placed on a horizontal work bench such that the axis of the roll 32 extends horizontally. A shaping plate is pressed against the roll 32 from above. The shaping plate includes a rectangular frame and a mesh stretched across the frame. A perforated plate may be used instead of the mesh.

The shaping plate is horizontally held such that the longitudinal direction of the plate is parallel to the axis of the roll 32, and is pressed against the roll 32 from above, thereby compressing the roll 32 to a predetermined thickness. After that, the shaping plate is coupled to the end plates 40 and 50.

A shaping plate is pressed against the outer circumferential surface of the roll 32 in each of the other three directions and is coupled to the end plates 40 and 50. The roll 32 is compressed in the four directions by using four shaping plates in the above-described manner, thus forming a rectangular prism-shaped compressed inorganic fiber product.

The compressed product is immersed in a binder liquid containing an inorganic sol. In this case, preferably, the compressed product is immersed in the binder liquid such that the axis of the compressed product extends vertically and the end plate 50 having the opening 53 is located as the bottom of the structure. The binder liquid permeates the compressed product from an inner circumferential surface thereof through the small holes of the front part 10 and the rear part 20 of the core mold 9, and also permeates the compressed product from an outer circumferential surface thereof through the shaping plates. In addition, the binder liquid directly permeates the compressed product from an exposed surface thereof that is not covered with the shaping plates and the end plates 40 and 50.

After at least the inner and outer circumferential surfaces of the compressed product are permeated with the binder liquid, the compressed product is taken out of the binder liquid. Preferably, the compressed product is immersed for a short time and is then taken out of the binder liquid, such that only the inner and outer circumferential surfaces of the compressed product are permeated with the binder liquid and the intermediate region is permeated with little or no binder liquid. This allows the intermediate region 2b to have low bulk densities, thus achieving a lightweight structure. This can improve easy handling, reduce the amount of alumina sol used as a raw material, and this reduce the manufacturing cost.

The inside of the core mold 9 of the compressed product taken out of the binder liquid is subjected to suction. Consequently, air is sucked into the compressed product through the exposed surface of the compressed product and the meshes of the shaping plates, so that part of the binder liquid held in the compressed product is sucked and discharged into an inner hole of the core mold 9.

After suction and discharge of the binder liquid for a predetermined period of time, the compressed product is moved to a drier (not illustrated), and is dried at a temperature of preferably 100° C. or higher. Then, the compressed product is taken out of the drier, and is cooled. After that, the shaping plates are removed from the compressed product and the core mold 9 is also removed from the compressed product. At this time, the adhesive sheet wrapped around the roll 32 and the mold release sheet wrapped around the core mold 9 are also removed.

The compressed product dried and released from the mold in the above-described manner is moved into a firing furnace (not illustrated), and is fired such that the inorganic binder is fixed to the inorganic fiber. Thus, a raw burner tile base is obtained. The burner tile base has the main hole 3, formed by removing the core mold 9, for mounting a burner. Projections (burrs) are removed from the burner tile base. Additionally, the raw burner tile base is shaped and machined so as to have predetermined dimensions. A pilot burner hole and a site hole may be formed in the burner tile base as necessary. Thus, the burner tile 1 is formed. For shaping and machining, for example, a high-speed shearing machine, such as a band saw, may be used to shape and machine, for example, a portion to be connected to a burner.

To form a pilot burner hole or a site hole in the burner tile, the burner tile is preferably, but not limited to, disposed in a box-shaped guide angled and positioned, and is bored using a cork borer or the like.

In the burner tile 1 made in the above-described manner, an excess of the binder liquid permeated through the compressed product is sucked and discharged into the inner hole. Consequently, the amount of binder remained and fixed in part including the inner circumferential surface of the compressed product is large. In addition, since the fixed binder gradually increases in amount toward the inner hole of the compressed product, the high bulk density part 4 is formed along the inner circumferential surface of the main hole 3 of the burner tile 1. The high bulk density part 4, which has high bulk densities, exhibits excellent erosion resistance. The burner tile 1 includes the inorganic fiber and the inorganic binder and thus exhibits excellent fire resistance, heat resistance, and thermal shock resistance, and requires no preheating for temperature elevation. In addition, since the intermediate region 2b has low bulk densities, the burner tile 1 is lightweight and easy to handle.

The above-described method facilitates making a burner tile having a complicated shape.

Figure 11:
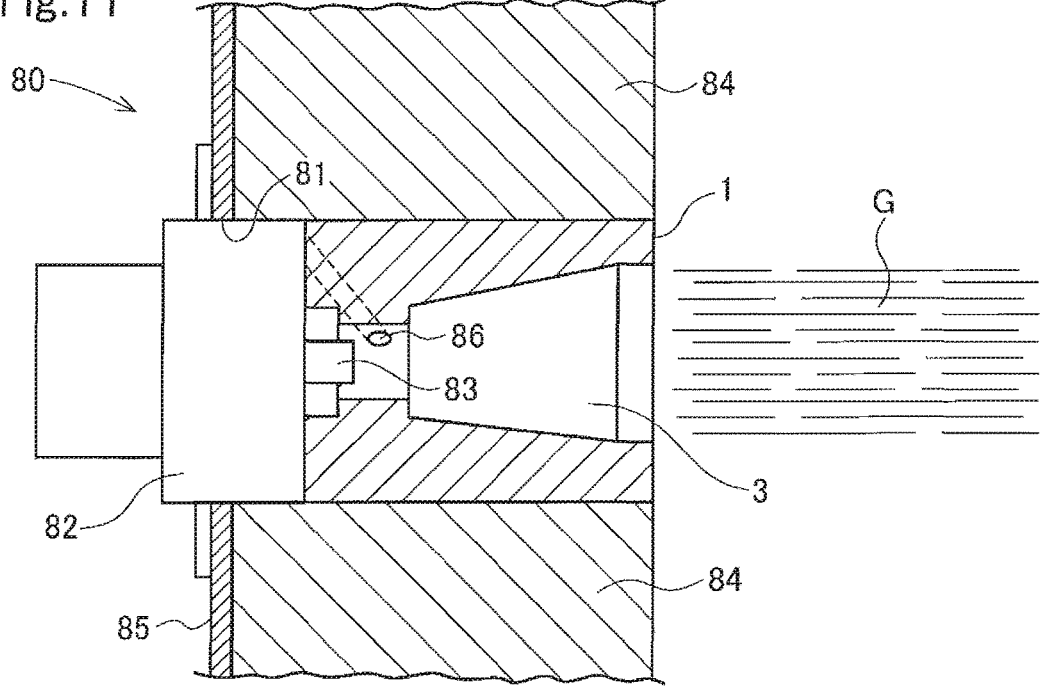
FIG. 11 is a sectional view illustrating part of a furnace including the burner tile.

FIG. 11 is a vertical sectional view illustrating a furnace wall of a furnace 80 including a burner and the burner tile 1. The burner tile 1 is disposed in a burner mounting aperture 81 of a shell 85 of the furnace 80 such that the burner tile 1 faces a furnace interior. A burner 82 includes a burner tip 83 disposed in the main hole 3 of the burner tile 1. The burner tile 1 is surrounded with a molded fire-resistant heat-insulating fiber product 84 made of alumina fiber. The burner tile 1 has a pilot burner hole 86. As the air and fuel emitted from the burner 82 are ignited, a combustion gas G is discharged from the main hole 3 into the furnace interior. Since the high bulk density part 4 extends along the inner circumferential surface of the main hole 3, the inner circumferential surface of the main hole 3 is prevented from being eroded when the gas G is blown at a high velocity.

Figure 12:
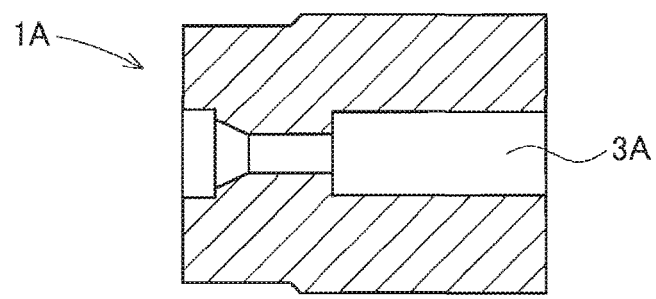
FIG. 12 is a sectional view of a burner the according to another embodiment.
Figure 13:
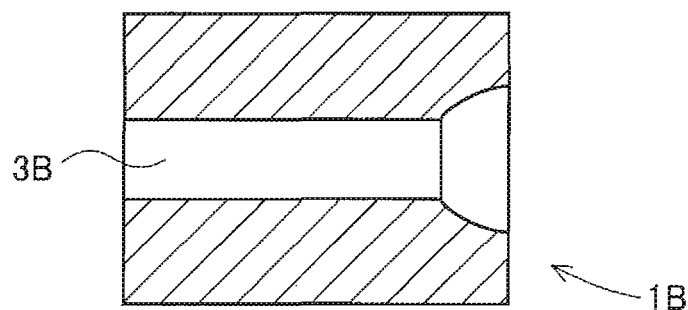
FIG. 13 is a sectional view of a burner tile according to another embodiment.

The shape of the burner tile 1 is an exemplary shape of the burner tile according to the present invention. The burner tile according to the present invention may have any other shape. FIGS. 12 and 13 illustrate the shapes of other burner tiles. FIG. 12 illustrates a burner the 1A having a main hole 3A that includes a constant-diameter cylindrical portion located adjacent to the furnace interior. FIG. 13 illustrates a burner tile 1B having a main hole 3B that includes a substantially hemispherical or cup-shaped portion located adjacent to the furnace interior. Although not illustrated, the main hole may be tapered, or increase in diameter from one end to the other end.

Figure 16:
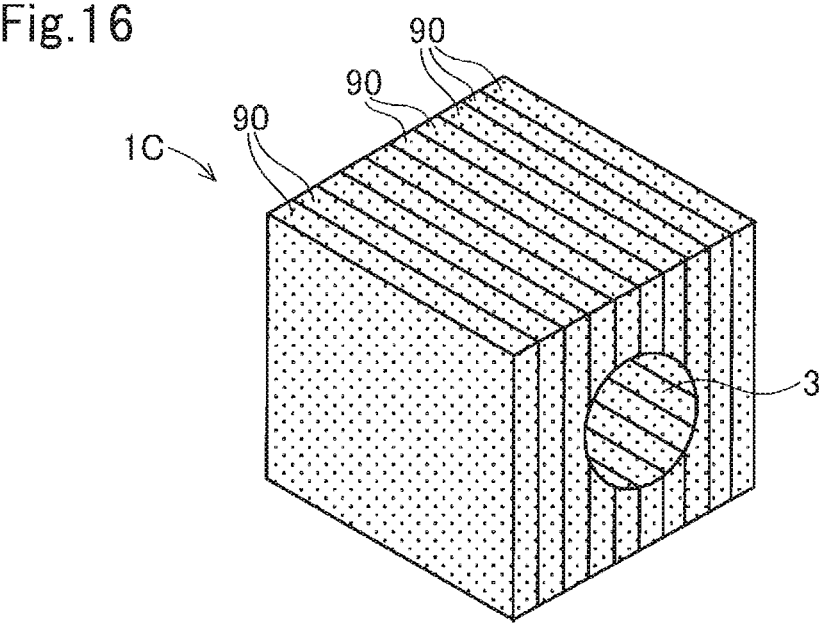
FIG. 16 is a perspective view of a burner tile according to still another embodiment.
Figure 17:
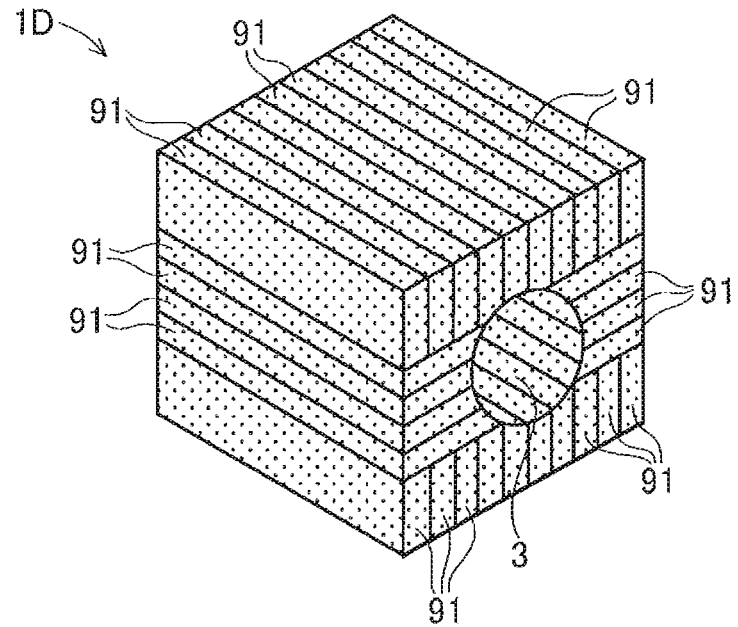
FIG. 17 is a perspective view of a burner tile according to further another embodiment.

Although the inorganic fiber laminates are rolled to form the burner tile in the above-described embodiment, plate-shaped inorganic fiber laminates 90 may be layered to form a cube or a cuboid, and the main hole 3 may be formed in the cube or cuboid, thus forming a burner tile 1C as illustrated in FIG. 16. Furthermore, as illustrated in FIG. 17, elongated rectangular plate-shaped inorganic fiber laminates 91 may be layered to form a set of laminates, the sets may be alternately stacked to form a cuboid, and the main hole 3 may be formed in the cuboid, thus forming a burner tile. The form obtained by rolling the inorganic fiber laminates is preferred in terms of easy fabrication of a burner tile and improved resistance of the completed burner tile. In the form obtained by rolling the inorganic fiber laminates, needled inorganic fiber aggregates tend to deform under external pressure caused when the burner tile 1 is shaped into a rectangle prism, leading to formation of clearances between the needled inorganic fiber aggregates. According to the present invention, however, the burner tile has a laminated structure including a laminate of a needled inorganic fiber aggregate having a relatively low bulk density and a needled inorganic fiber aggregate having a relatively high bulk density, such that a clearance formed by deformation of the relatively high bulk density needled inorganic fiber aggregate is filled with the relatively low bulk density needled inorganic fiber aggregate deformed appropriately. Advantageously, no clearance is formed between the aggregates, or layers. More preferably, the laminated structure includes a series of laminates each including the relatively low bulk density needled inorganic fiber aggregate and the relatively high bulk density needled inorganic fiber aggregate.

Figure 19:
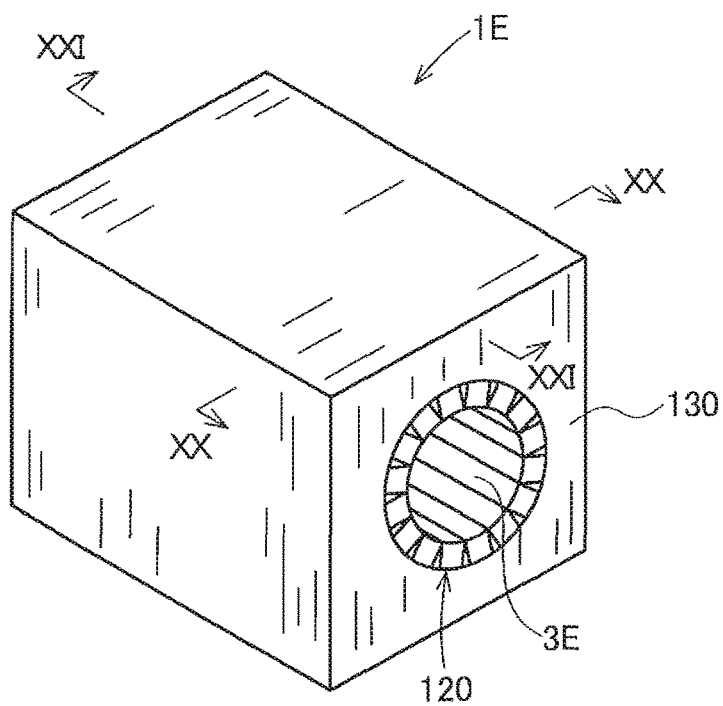
FIG. 19 is a perspective view of a burner tile according to an embodiment.
Figure 20:
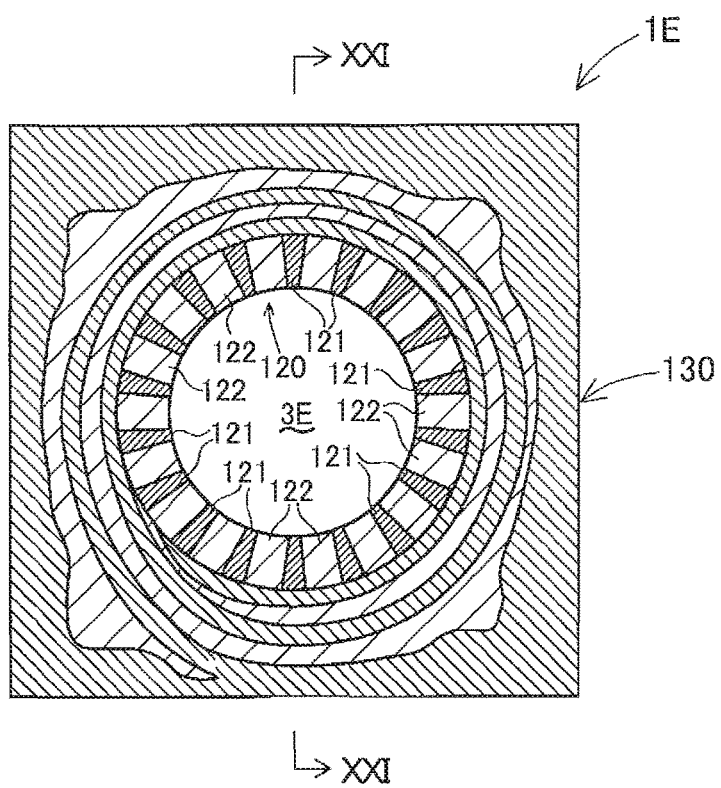
FIG. 20 is a cross-sectional view taken along line XX-XX in FIG. 19.
Figure 21:
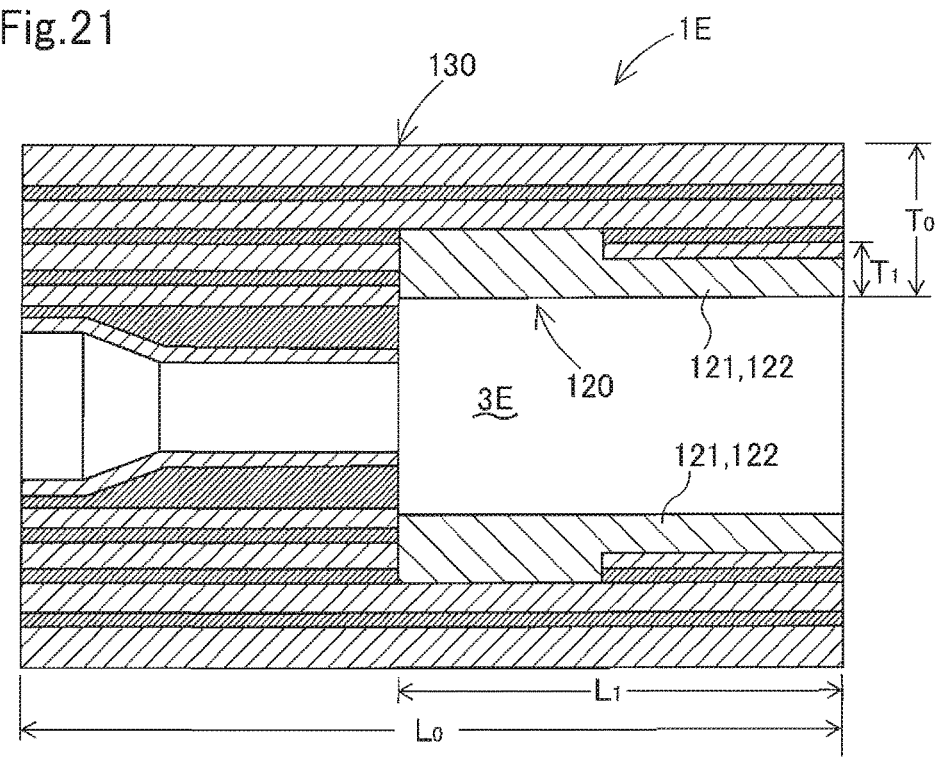
FIG. 21 is a sectional view taken along line XXI-XXI in FIGS. 19 and 20.

An example of a burner tile according to a first invention will now be described with reference to FIGS. 19 to 21. This burner tile, 1E, has a main hole 3E extending through the burner tile in a furnace interior-exterior direction. The tip of a burner is inserted into the main hole 3E from a furnace exterior side. Although right part of the main hole 3E adjacent to a furnace interior has a larger diameter than left part of the main hole 3E adjacent to a furnace exterior, the shape of the main hole 3E is not limited to this example.

The burner the tile 1E includes an inner layer 120 and an outer layer 130 surrounding the inner layer 120. The inner layer 120 surrounds the part of the main hole 3E adjacent to the furnace interior. The outer layer 130 surrounds the part of the main hole 3E adjacent to the furnace exterior and an outer circumferential surface of the inner layer 120. Referring to FIG. 21, a distal portion (adjacent to the furnace interior) of the inner layer 120 has an outside diameter slightly smaller than that of a proximal portion of the inner layer 120. This prevents the inner layer 120 from moving toward the furnace interior.

The inner layer 120 includes first rods 121 each having a triangular or trapezoidal cross-section perpendicular to the axis of the main hole 3E and second rods 122 each having a rectangular cross-section perpendicular to the axis of the main hole 3E such that the first rods 121 and the second rods 122 are alternately arranged and combined. The first rods 121 having the triangular or trapezoidal cross-section are arranged such that one vertex of the triangle or the short side of the trapezoid faces an inner circumferential surface of the main hole 3E. The second rods 122 having the rectangular cross-section are arranged such that one short side of the rectangle faces the inner circumferential surface of the main hole 3E. The rods 121 and 122 extend along the axis of, or longitudinally of the main hole 3E. The rods 121 and 122 are alternately arranged along the circumference of the main hole 3E, thus forming a roll of the combination (laminate) of the rods 121 and 122 surrounding the main hole 3E. In this roll, end surfaces of the rods 121 and 122 are arranged substantially radially from the main hole 3E.

The outer layer 130 is formed by wrapping a mat-shaped molded inorganic fiber product (blanket) 131 several turns around rear part of the main hole 3E and the outer circumferential surface of the inner layer 120. As described above, part of the inner circumferential surface of the main hole 3E of the burner tile 1E adjacent to the furnace exterior is defined by the outer layer 130 in this embodiment. The inner layer 120 extends through part of the burner tile 1E in the furnace interior-exterior direction from an end face of the burner tile 1E facing the furnace interior. Referring to FIG. 21, $L_0$ denotes the length of the burner tile 1E in the furnace interior-exterior direction and $L_1$ denotes the length of the inner layer 120. The percentage of $L_1/L_0$ is preferably 15% to 70%, more preferably 20% to 60%.

The outer layer 130 is formed by wrapping the molded inorganic fiber product (blanket) around a core mold, as will be described below. The inner layer 120 is disposed only adjacent to the furnace interior, and the part of the inner circumferential surface of the main hole 3E adjacent to the furnace exterior is defined by the outer layer 130. In this case, the accuracy of form of the part of the inner circumferential surface of the main hole adjacent to the furnace exterior can be increased. This enables a burner nozzle to be disposed concentrically with the main hole 3E with high accuracy.

In this embodiment, the outside shape of the burner tile 1E is a cuboid. Referring to FIG. 21, $T_0$ denotes the thickness of the burner tile 1E and $T_1$ denotes the average thickness of the inner layer 120 in a cross-section in which the burner tile 1E has a minimum thickness in its radial direction relative to the axis of the main hole 3E. The percentage of $T_1/T_0$ is preferably 20% to 70%, more preferably 30% to 60%.

In this embodiment, part extending along the inner circumferential surface 3f of the main hole 3E is the high bulk density part 4 having high bulk densities as in FIG. 4. As will be described later, the burner tile 1E is made by forming a burner-tile-shaped molded product using the rods 121 and 122 made of the inorganic fiber blanket and the blanket 131, fixing the inorganic binder to the molded product, drying the product, and firing it. Highly concentrating the inorganic binder in the part extending along the inner circumferential surface 3f of the main hole forms the high bulk density part 4 along the inner circumferential surface 3f.

A vertical section of the burner tile 1E according to this embodiment and that of a furnace wall including the burner tile 1E are the same as those illustrated in FIG. 11.

In the burner tile 1E, the inner circumferential surface of the main hole to be exposed to the combustion gas G is defined by the inner layer 120 including the rods 121 and 122, made of the inorganic fiber, arranged and combined such that the end surfaces of the rods 121 and 122 extend radially. In addition, the interface between the inner layer 120 and the outer layer 130 is away from the inner circumferential surface of the main hole 3E. This maintains good conditions at the interface between the inner layer 120 and the outer layer 130 if the crystallization of the inorganic fiber included in the rods 121 and 122 progresses due to long-term operation of the burner. Thus, the rods 121 and 122 can be prevented from falling. Furthermore, a burner flame may eccentrically blow out, causing local heating. Since the inorganic fiber forming the inner wall is segmented along the circumference of the inner wall and the segments are compressed in a contraction direction of the inorganic fiber, the fiber can be prevented from falling.

Although superposed surfaces of the rods 121 and 122 included in the inner layer 120 radially extend, heat transmitting through the superposed surfaces of the rods 121 and 122 is blocked by the outer layer 130 formed of the inorganic fiber laminate wrapped several turns around the inner layer 120. Thus, the burner tile 1E has good heat insulating properties. Since the high bulk density part 4 is provided along the inner circumferential surface of the main hole 3E, the inner circumferential surface of the main hole 3E is prevented from being eroded by a high velocity jet of the gas G.

In this embodiment, the part of the main hole 3E adjacent to the furnace exterior is shaped in a cylinder having an inner circumferential surface with high circularity. This enables the burner tip 83 to be disposed concentrically with the main hole 3E with high accuracy.

The shape of the above-described burner tile 1E is an example of a burner tile according to a first invention. The burner tile according to the first invention may have any other shape. For example, although not illustrated, the main hole may be tapered, or increase in diameter from one end to the other end.

Figure 22A:
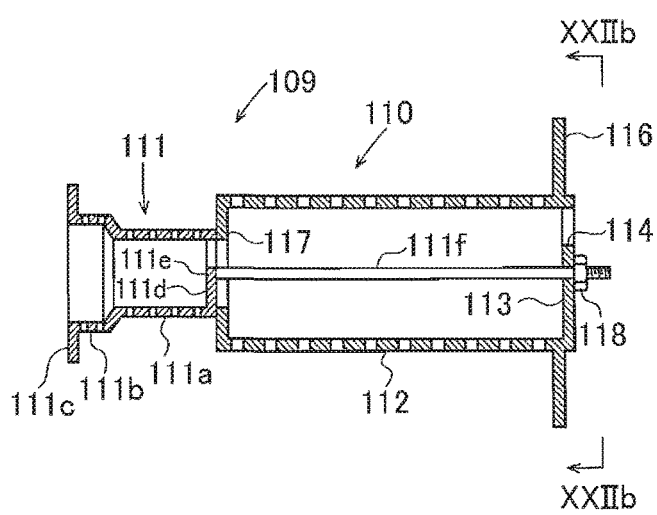
Figure 22B:
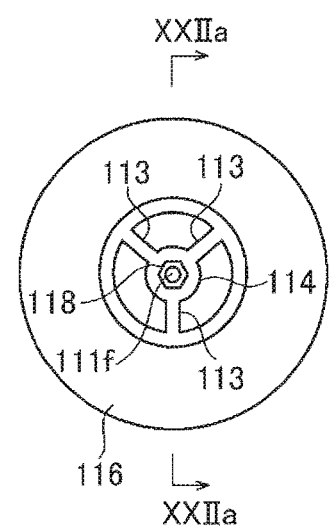
Figure 23:
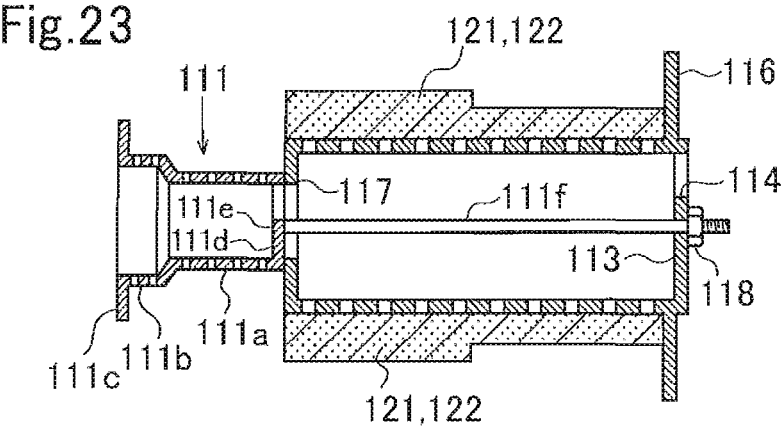
FIG. 23 is a sectional view explaining a method of making the burner tile.

An exemplary method of making the burner tile 1E will now be described with reference to FIGS. 22a to 26. FIG. 22a is an axially longitudinal sectional view of a core mold 109, which is used to mold the burner tile 1E, taken along line XXIIa-XXIIa in FIG. 22b. FIG. 22b is a plan view of the core mold 109 as viewed in the direction of arrows XXIIb-XXIIb in FIG. 22a.

The core mold 109 includes a front part 110 and a rear part 111 fastened to the front part 110. The front part 110 is cylindrical and is formed of a perforated plate having many small holes. The front part 110 includes a cylindrical portion 112, a plurality of (in this embodiment, three) spokes 113 radially arranged at a front end of the cylindrical portion 112, a boss 114 connecting to inner ends of the radially extending spokes 113, a bolt insertion hole 115 extending through the boss 114, a flange 116 extending outwardly from an outer circumferential surface of the cylindrical portion 112, and an inwardly extending collar 117 extending inwardly from a rear end of the cylindrical portion 112.

The rear part 111 is cylindrical and is formed of a perforated plate having many small holes. The rear part 111 includes a first cylindrical portion 111a having a small diameter, a second cylindrical portion 111b having a large diameter and connecting to a rear end of the first cylindrical portion 111a, a flange 111c extending outwardly from an outer circumferential surface of a rear end of the second cylindrical portion 111b, a plurality of spokes 111d radially arranged at a front end of the first cylindrical portion 111a, a boss 111e connecting to inner ends of the radially extending spokes 111d, and a long bolt 111f extending from the boss 111e axially through the front part 110.

The first cylindrical portion 111a of the rear part 111 is come into contact with the inwardly extending collar 117 of the front part 110. A free end of the long bolt 111f is inserted into the bolt insertion hole 115. A nut 118 is screwed and tightened onto the free end of the long bolt 111f, thus fastening and integrating the front part 110 and the rear part 111 into the core mold 109 which is substantially cylindrical. The parts 110 and 111 are preferably made of metal or plastic, more preferably metal.

An outer circumferential surface of the core mold 109 is wrapped with a mold release sheet (not illustrated) made of, for example, glass cloth. After that, as illustrated in FIG. 24, the rods 121 and 122 made of the inorganic fiber blanket are alternately arranged and combined along the circumference of the front part 110 such that the end surfaces of the rods extend radially about the axis of the core mold 109, thus surrounding the front part 110.

When the rods 121 and 122 are arranged, the rods 121 and 122 are preferably compressed. This increases the circularity of the main hole 3E and generates no clearance between the rods 121 and 122.

Although means for compressing the rods 121 and 122 is not limited to any particular means, an auxiliary tool, such as a fastening belt, may be used to compress the rods 121 and 122 to a predetermined compressibility, and the rods 121 and 122 may then be fixed with a band or a tape (not illustrated). Thus, the rods 121 and 122 can be compressed. The compressibility is preferably greater than or equal to 10% in terms of their required properties, such as erosion resistance, and is preferably less than or equal to 50% to prevent the fiber from collapsing due to compression.

Figure 24:
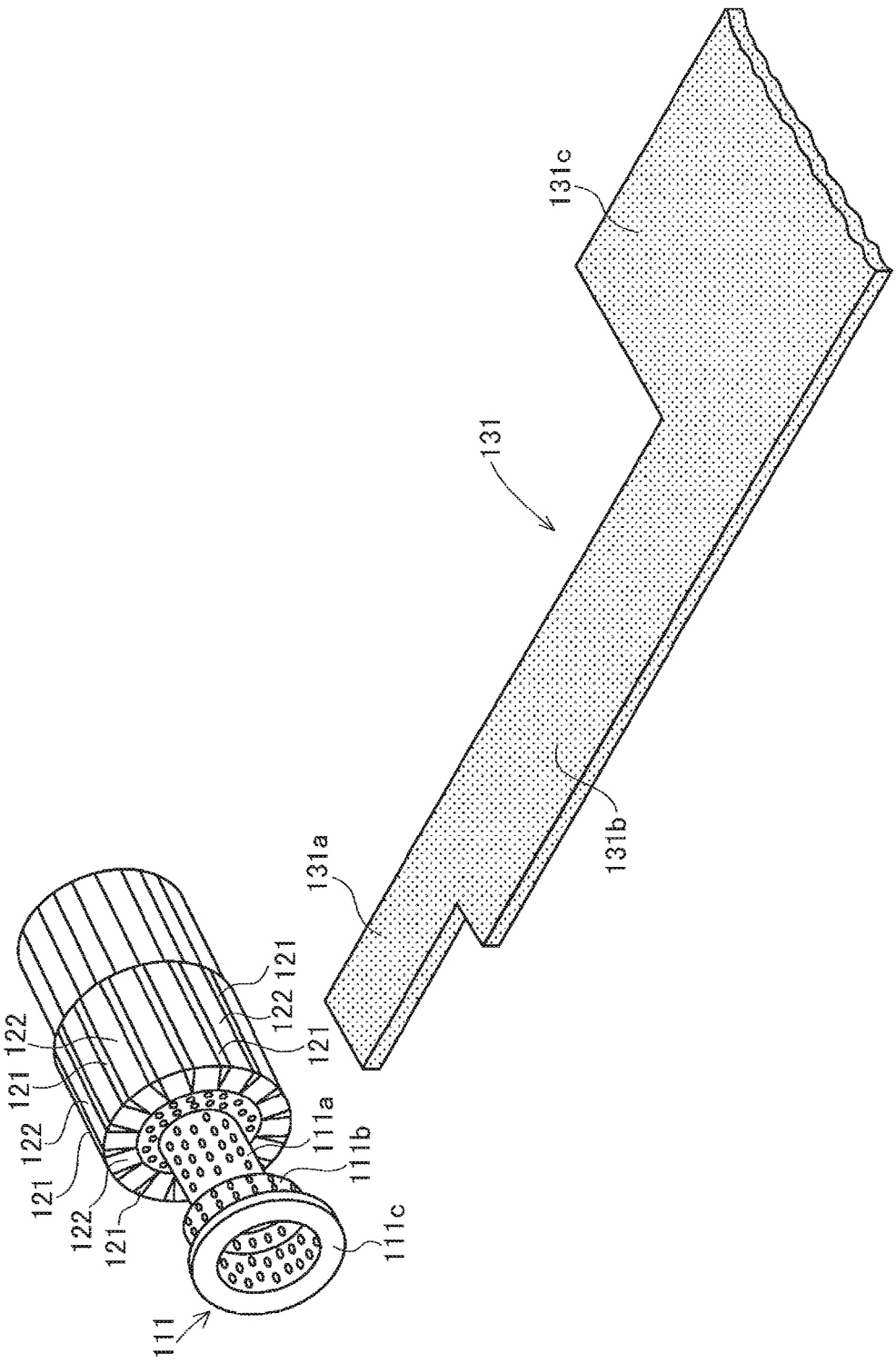
FIG. 24 is a perspective view explaining the method of making the burner tile.

Then, an outer circumferential surface of the rear part 111 and an outer circumferential surface of the roll including the inorganic fiber rods 121 and 122 are wrapped with the inorganic fiber laminate (blanket) 131, as illustrated in FIG. 24. The inorganic fiber laminate 131 includes a narrow-width portion 131a, serving as a leading portion, an intermediate-width portion 131b that follows the narrow-width portion 131a, and a full-width portion 131c that follows the intermediate-width portion 131b.

The inorganic fiber laminate 131 may be a laminate of two or more inorganic fiber blankets having different densities.

The narrow-width portion 131a has a width that is the same as the axial length of the first cylindrical portion 111a of the rear part 111. The intermediate-width portion 131b has a width that is the same as the axial length of the rear part 111. The full-width portion 131c has a width that is the same as the distance between the flanges 116 and 111c.

Figure 25:
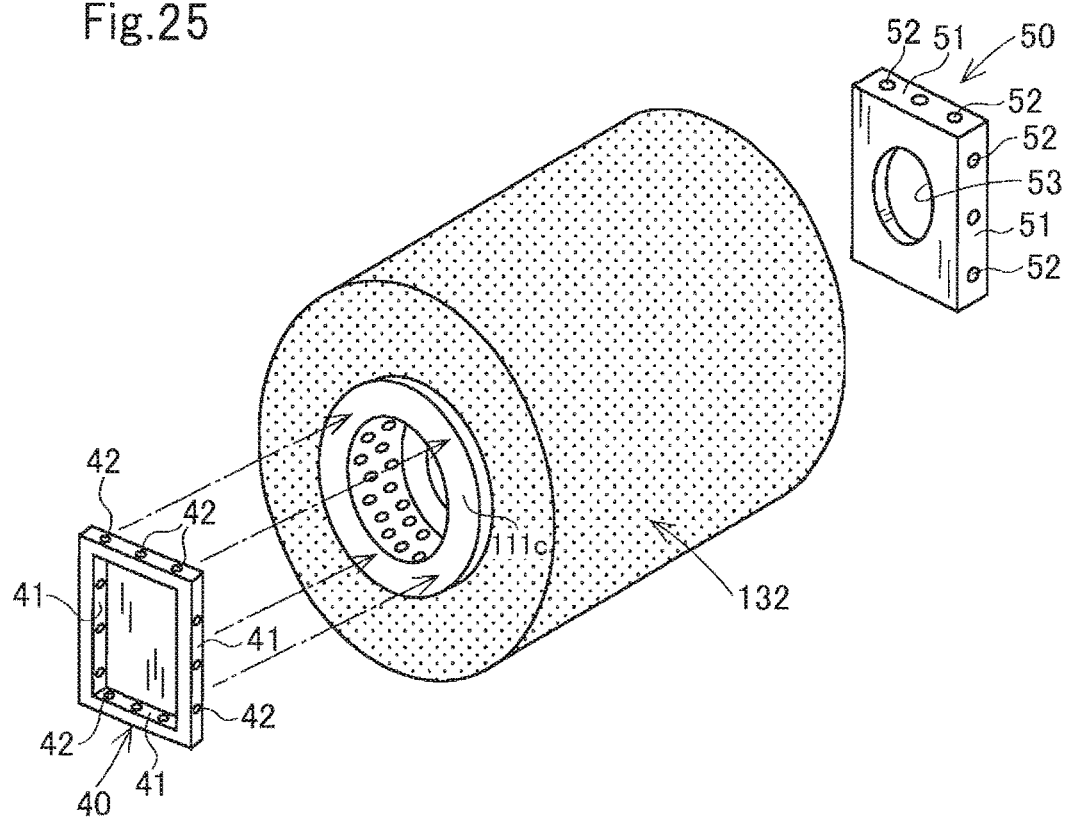
FIG. 25 is a perspective view explaining the method of making the burner tile.
Figure 26:
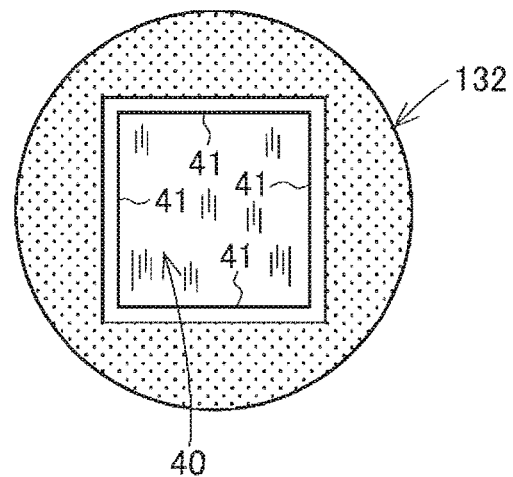
FIG. 26 is a side view of a roll.

When the narrow-width portion 131a is wrapped around the first cylindrical portion 111a, a roll of the narrow-width portion 131a has substantially the same diameter as that of the second cylindrical portion 111b. Then, the intermediate-width portion 131b is wrapped around the rolled narrow-width portion 131a and the second cylindrical portion 111b such that the intermediate-width portion 131b extends over an outer circumferential surface of the intermediate-width portion 131b and that of the second cylindrical portion 111b. A roll of the intermediate-width portion 131b has substantially the same diameter as that of the roll including the rods 121 and 122. After that, the full-width portion 131c is wrapped around the roll of the intermediate-width portion 131b and the roll including the rods 121 and 122 such that the full-width portion 131c extends over outer circumferential surfaces of these rolls, thus forming a roll 132 as illustrated in FIGS. 25 and 26.

It is preferred that a porous adhesive sheet (not illustrated) be wrapped around an outer circumferential surface of the roll 132 to maintain the shape of the roll 132. The end plates 50 and 40 are attached to the flanges 116 and 111c of the core mold 109 with the roll 132 using bolts (not illustrated), respectively. The end plates 40 and 50 are square plate-shaped members as in the above-described embodiment. The end plate 40 includes the rib 41 extending outwardly from the four edges of the plate. The end plate 50 includes the rib 51 extending outwardly from the four edges of the plate. The rib 41 has the small holes 42 arranged parallel to a surface of the plate 40. The rib 51 has the small holes 52 arranged parallel to a surface of the plate 50. The end plate 50 has the circular opening 53 having substantially the same diameter as an inside diameter of the second cylindrical portion 111b of the core mold 109.

After the end plates 40 and 50 are attached to the core mold 109, the roll 132 is placed on a horizontal work bench such that the axis of the roll 132 extends horizontally. A shaping plate is pressed against the roll 132 from above. The shaping plate includes a rectangular frame and a mesh stretched across the frame. A perforated plate may be used instead of the mesh.

The shaping plate is horizontally held such that the longitudinal direction of the plate is parallel to the axis of the roll 132, and is pressed against the roll 132 from above, thereby compressing the roll 132 to a predetermined thickness. After that, the shaping plate is coupled to the end plates 40 and 50.

A shaping plate is pressed against the outer circumferential surface of the roll 132 in each of the other three directions and is coupled to the end plates 40 and 50. The roll 132 is compressed in the four directions by using four shaping plates in the above-described manner, thus forming a rectangular prism-shaped compressed inorganic fiber product.

The compressed product is immersed in a binder liquid containing an inorganic sol. In this case, preferably, the compressed product is immersed in the binder liquid such that the axis of the compressed product extends vertically and the end plate 50 having the opening 53 is located as the bottom of the product. The binder liquid permeates the compressed product from an inner circumferential surface thereof through the small holes of the front part 110 and the rear part 111 of the core mold 109, and also permeates the compressed product from an outer circumferential surface thereof through the shaping plates. In addition, the binder liquid directly permeates the compressed product from an exposed surface thereof that is not covered with the shaping plates and the end plates 40 and 50.

After at least the inner and outer circumferential surfaces of the compressed product are permeated with the binder liquid, the compressed product is taken out of the binder liquid. Immersion time can be appropriately controlled based on, for example, the size and structure of the compressed product or the composition of the binder liquid. It is preferred to immerse the compressed product in the binder liquid until bubbles generated from the compressed product are not visibly observed. The compressed product may be immersed for a short time and then taken out of the binder liquid, such that only the inner and outer circumferential surfaces of the compressed product are permeated with the binder liquid and the intermediate region is permeated with little or no binder liquid. This allows an intermediate region 1b, which will be described later, to have low bulk densities, thus achieving a lightweight structure. This can improve easy handling, reduce the amount of alumina sol used as a raw material, and thus reduce the manufacturing cost.

The inside of the core mold 109 of the compressed product taken out of the binder liquid is subjected to suction. Consequently, air is sucked into the compressed product through the exposed surface of the compressed product and the meshes of the shaping plates, so that part of the binder liquid held in the compressed product is sucked and discharged into an inner hole of the core mold 109.

After suction and discharge of the binder liquid for a predetermined period of time, the compressed product is moved to a drier (not illustrated), and is dried at a temperature of preferably 100° C. or higher. Then, the compressed product is taken out of the drier, and is cooled. After that, the shaping plates are removed from the compressed product and the core mold 109 is also removed from the compressed product. At this time, the adhesive sheet wrapped around the roll 132 and the mold release sheet wrapped around the core mold 109 are also removed.

The compressed product dried and released from the mold in the above-described manner is moved into a firing furnace (not illustrated), and is fired such that the inorganic binder is fixed to the inorganic fiber. Thus, a burner tile base is obtained. The burner tile base has the main hole 3E, formed by removing the core mold 109, for mounting a burner. Projections (burrs) are removed from the burner tile base. Additionally, the burner tile base is shaped and machined so as to have predetermined dimensions. A pilot burner hole and a site hole may be formed in the burner tile base as necessary. Thus, the burner tile 1E is formed. For shaping and machining, for example, a high-speed shearing machine, such as a band saw, may be used to shape and machine, for example, a portion to be connected to a burner.

To form a pilot burner hole or a site hole in the burner tile, the burner tile is, preferably, but not limited to, disposed in a box-shaped guide angled and positioned, and is bored with a cork borer or the like.

In the burner tile 1E made in the above-described manner, an excess of the binder liquid permeated through the compressed product is sucked and discharged into the inner hole. Consequently, the amount of binder remained and fixed in part including the inner circumferential surface of the compressed product is large. In addition, since the fixed binder gradually increases in amount toward the inner hole of the compressed product, the high bulk density part 4 (FIG. 4) is formed along the inner circumferential surface of the main hole 3E of the burner tile 1E. The high bulk density part 4, which has high bulk densities, exhibits excellent erosion resistance. The burner tile 1E includes the inorganic fiber and the inorganic binder and thus exhibits excellent fire resistance, heat resistance, and thermal shock resistance, and requires no preheating for temperature elevation. In addition, since the intermediate region 1b has low bulk densities, the burner tile 1E is lightweight and easy to handle.

The above-described method facilitates making a burner tile having a complicated shape. Since the outer layer 130 defining the part of the inner circumferential surface of the main hole 3E adjacent to the furnace exterior is molded in the same shape as that of the core mold 109, the outer layer 130 is a cylinder having high circularity.

In this embodiment, as in FIGS. 4 and 5, when the burner tile 1E is equally divided into three regions arranged concentrically about the axis of the main hole an inner region 1a corresponding to the innermost third part closest to the main hole 3E, an outer region 1c corresponding to the outermost third part, and the intermediate region 1b corresponding to the intermediate third part between the regions 1a and 1c, Di is greater than Dm where Di denotes the bulk density of part in the inner region 1a extending from the inner circumferential surface 3f of the main hole to the depth d=5 mm in the thickness direction, and Dm denotes the bulk density in the intermediate region 1b.

Preferred ranges of Di, Dm, Di-Dm, and Di/Dm are the same as those in the above-described embodiment.

In this burner tile 1E, the intermediate region 1b preferably includes a plurality of inorganic-binder-impregnated inorganic fiber aggregate layers having different bulk densities.

Figure 1:
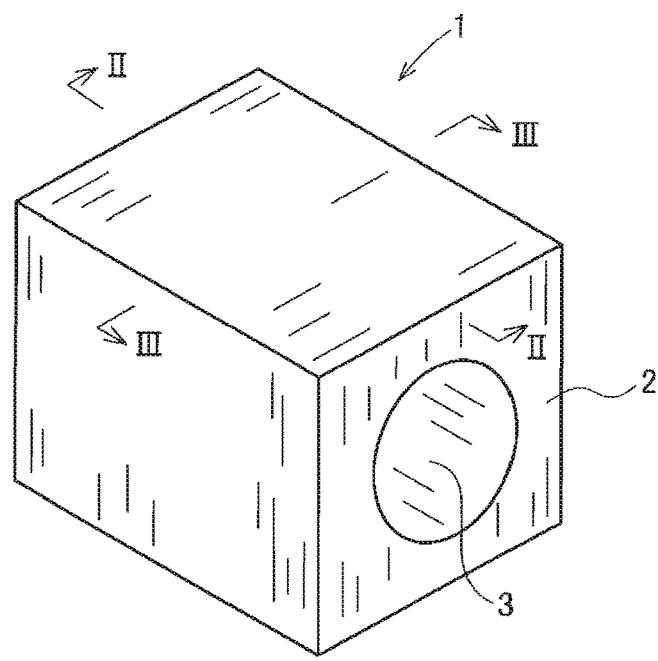
FIG. 1 is a perspective view of a burner tile according to an embodiment.
Figure 2:
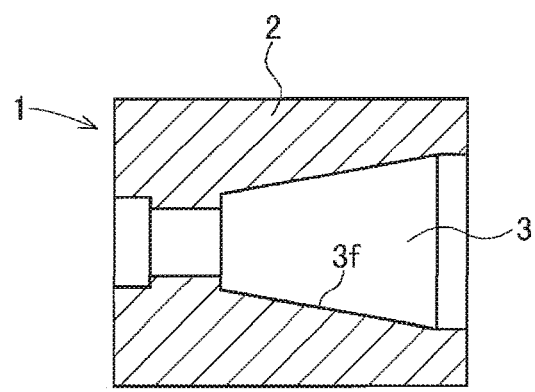
FIG. 2 is a sectional view taken along line II-II in FIG. 1.
Figure 3:
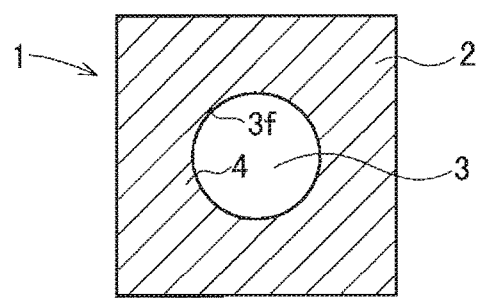
FIG. 3 is a cross-sectional view taken along line III-III in FIG. 1.

In the burner tile 1E, as in FIG. 3, the bulk density may decrease linearly from the inner circumferential surface 3f toward the outer surface. As illustrated in FIG. 14, the bulk density may relatively sharply decrease from the inner circumferential surface to the intermediate region and then gradually decrease from the intermediate region to the outer surface.

The burner tile 1E may increase in bulk density toward the outer surface as illustrated in FIG. 15. Increased bulk densities of part including the outer surface reduce deformation caused by touching the outer surface of the burner tile. This allows easy handling of the burner tile. When $D_o$ denotes the bulk density of part in the outer region 1c extending from an outer surface 1g to the depth h=5 mm in the thickness direction, preferred ranges of $D_o$ are the same as those in the burner tile 1.

Since the burner tile 1E includes the high bulk density part 4 extending along the inner circumferential surface 3f of the main hole, the burner tile 1E exhibits excellent erosion resistance. In addition, since the burner tile 1E has low bulk densities in the intermediate region 1 the burner tile 1E is lightweight and exhibits excellent thermal shock resistance.

The burner tile preferably includes a molded rolled inorganic fiber product including a plurality of inorganic-binder-impregnated inorganic fiber aggregate layers having different bulk densities to achieve uniform thermal conductivity, as well as to enhance both erosion resistance and shock absorbance.

In the above-described embodiments, needled inorganic fiber aggregates (blankets) tend to deform under external pressure caused when the outside shape of the burner tile 1, 1E is shaped into a rectangular prism, leading to formation of clearances between the needled inorganic fiber aggregates. According to the present invention, however, the burner tile has a laminated structure including a laminate of a needled inorganic fiber aggregate having a relatively low bulk density and a needled inorganic fiber aggregate having a relatively high bulk density, such that a clearance formed by deformation of the relatively high bulk density needled inorganic fiber aggregate is filled with the relatively low bulk density needled inorganic fiber aggregate deformed appropriately. Advantageously, no clearance is formed between the aggregates, or layers. More preferably, the laminated structure includes a series of laminates each including the relatively low bulk density needled inorganic fiber aggregate and the relatively high bulk density needled inorganic fiber aggregate.

In the above-described embodiments, the outside shape of each of the burner tiles 1 and 1E is a rectangular prism. The outer shape of the burner tile may be a cylinder or a polygonal prism, such as a hexagonal prism.

A cylindrical burner tile is preferably made by molding a substantially cylindrical compressed product with two semi-cylindrical (halved) shaping plates, or preferably made by molding a substantially cylindrical compressed product with four quarter-cylindrical (quartered) shaping plates. A hexagonal prism-shaped burner tile is preferably made by compressing and molding a roll in six directions with six shaping plates into a compressed product.

A hexagonal or octagonal prism-shaped burner tile may be made by cutting a rectangular prism-shaped burner tile.

Although the compressed product is immersed in the binder liquid in each of the above-described embodiments, the binder liquid may be sprayed on or applied to the inner circumferential surface and the outer surface of the compressed product to impregnate the product with the binder liquid. The inorganic fiber mat or the roll to be a compressed product may be impregnated with the binder liquid.

Figure 27:
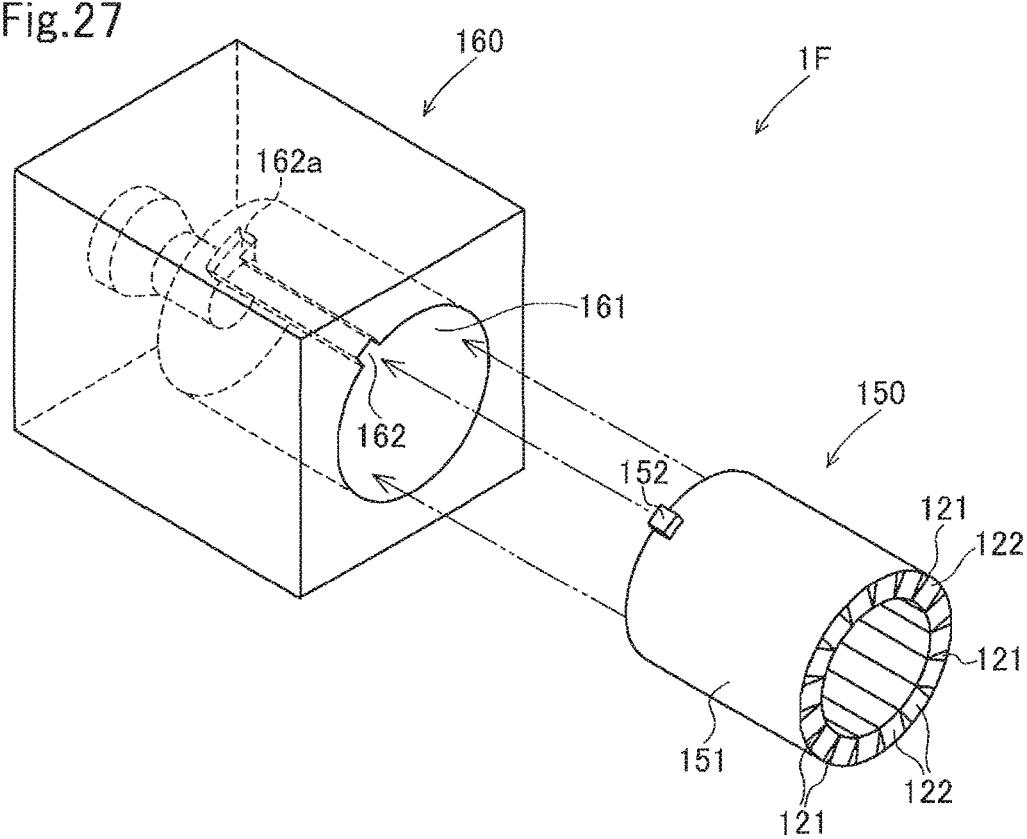
FIG. 27 is an exploded perspective view of a burner tile according to another embodiment.

Another example of the burner tile according to the first invention will now be described with reference to FIG. 27. A burner tile 1F includes a cylindrical member fitted in part of an inner circumferential surface of a main hole adjacent to the furnace interior, a main body in which the cylindrical member is detachably fitted, and anti-separating means for preventing the cylindrical member from separating from the main body and moving toward the furnace interior.

Like the burner tile 1E, the burner tile 1F includes an inner layer 150 (cylindrical member) and an outer layer 160 (main body) in which the inner layer 150 is fitted.

The inner layer 150 (cylindrical member) is made by alternately arranging and combining the first rods 121, each having a triangular or trapezoidal cross-section perpendicular to the axis of the main hole 3E, and the second rods 122, each having a rectangular cross-section perpendicular to the axis of the main hole, shaping the combined rods into a hollow cylinder, impregnating the cylinder with a binder liquid, drying the cylinder, and firing it. The inner layer 150 has a protrusion 152 extending outwardly from an outer circumferential surface of the inner layer 150 adjacent to a rear end thereof. This protrusion is integrated with at least one of the rods 121 and 122. Multiple protrusions, multiple grooves extending parallel to the axis, and multiple keyways may be arranged.

As in the above-described burner tile 1E, the first rods 121 having the triangular or trapezoidal cross-section are arranged such that one vertex of the triangle or the short side of the trapezoid faces the inner circumferential surface of the main hole. The second rods 122 having the rectangular cross-section are arranged such that one short side of the rectangle faces the inner circumferential surface of the main hole. The longitudinal direction of each of the rods 121 and 122 is identical to the axial direction of the main hole. The rods 121 and 122 are alternately arranged along the circumference of the main hole, thus forming a roll formed of a laminate or combination of the rods 121 and 122 surrounding the main hole, in this roll, end surfaces of the rods 121 and 122 extend substantially radially from the main hole.

The outer layer 160 (main body) has an inner hole 161 to which the inner layer 150 is inserted. An inner circumferential surface of the inner hole 161 has a groove 162 that extends parallel to the axis of the inner hole 161. The innermost part of the groove 162 has a keyway 162a that extends in a circumferential direction of the inner hole 161.

To make the outer layer 160, a molded inorganic fiber product (blanket) is wrapped around a core mold of the same type as that in FIG. 22a, and the end plates 40 and 50 are attached to the core mold as illustrated in FIG. 25. A roll formed in this manner is compressed in four directions by using four shaping plates, thus forming a compressed product whose outer shape is a rectangular prism. The compressed product is impregnated with the binder liquid, dried, released from the mold, and fired. Then, the inner circumferential surface of the outer layer 160 is subjected to cutting, thus forming the groove 162 and the keyway 162a. The groove 162 and the keyway 162a may be formed by molding the outer layer using a mold having a protrusion that has the same dimensions as those of the groove 162 and the keyway 162a.

The protrusion 152 is engaged with the groove 162, the inner layer 150 is inserted into the inner hole 161 of the outer layer 160, and the inner layer 150 is rotated in the circumferential direction, thus engaging the protrusion 152 with the keyway 162a. Then, the groove 162 is filled with a filler composed of an inorganic fiber laminate. Thus, the burner tile 1F is formed. In this case, preferably, an inorganic fiber laminate sheet 151 is wrapped around an outer circumferential surface of the inner layer 150 before the inner layer 150 is inserted into the outer layer 160, such that the inorganic fiber laminate sheet 151 is disposed in a clearance between the outer circumferential surface of the inner layer 150 and the inner hole 161 of the outer layer 160. Thus, restoring force (resilience) of the inorganic fiber laminate sheet 151 facilitates holding the inner layer 150 in the inner hole 161 of the outer layer 160. The wrapped inorganic fiber laminate sheet 151 may be bound with a binding rope (not illustrated) that can be burned out at high temperatures.

In impregnating with the binder liquid, highly concentrating the binder in the part extending along the inner circumferential surface of the main hole forms high bulk density part along the inner circumferential surface of the main hole.

In the burner tile 1F, the inner layer 150 is detachable from the outer layer 160. If the inner layer 150 deteriorates, only the inner layer 150 can be detached. The inner layer 150 can be repaired or replaced with a new inner layer 150.

Figure 28:
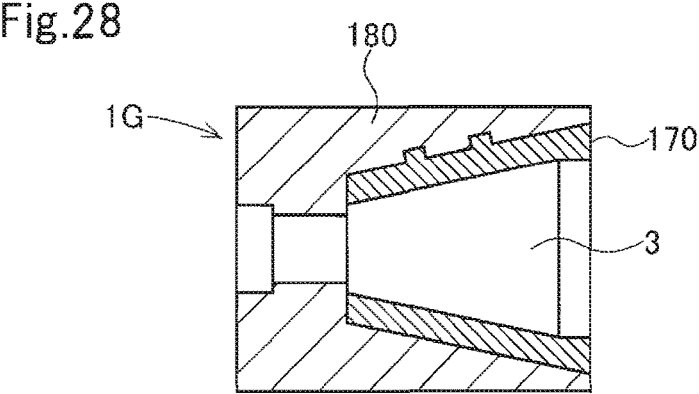
FIG. 28 is a sectional view of a burner tile according to another embodiment.
Figure 29:
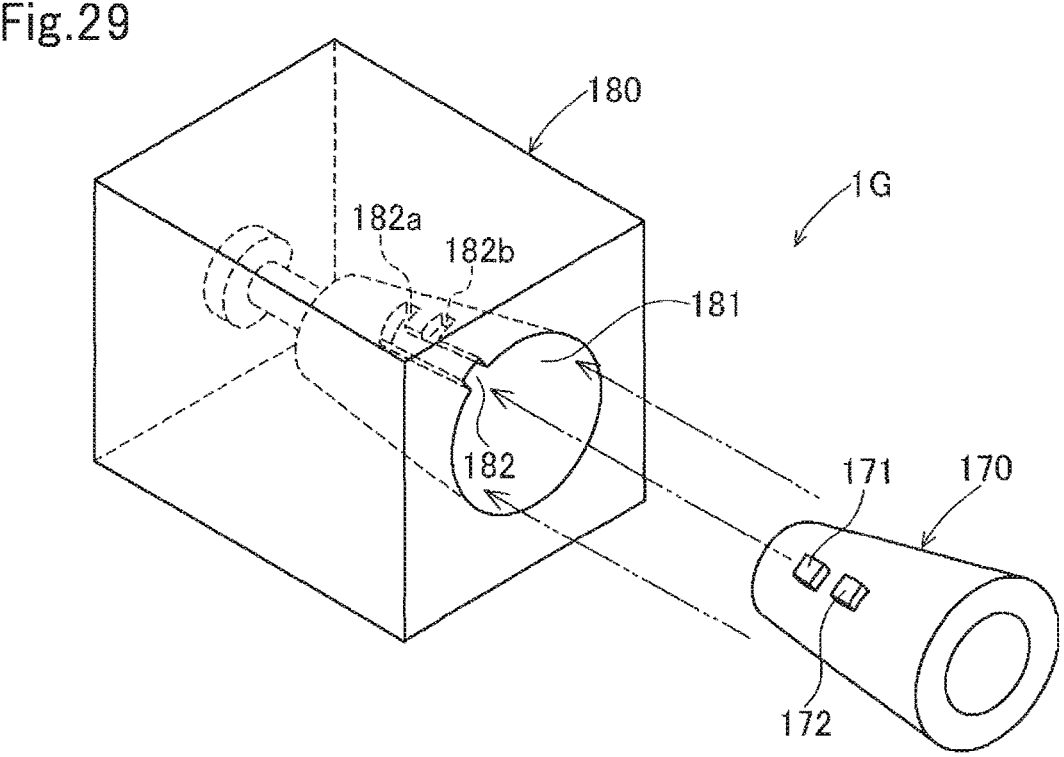
FIG. 29 is an exploded perspective view of the burner tile of FIG. 28.

FIGS. 28 and 29 illustrate a burner tile 1G having a form in which a cylindrical member is detachable from a main body. A cylindrical member 170 defines an inner circumferential surface of part of a main hole 3 of the burner tile 1G adjacent to the furnace interior. A main body 180 has an inner hole 181 into which the cylindrical member 170 is inserted. An inner circumferential surface of the inner hole 181 has a groove 182 extending along the axis of the inner hole 181. The groove 182 includes a keyway 182a at the innermost end of the groove and a keyway 182b at a position between the innermost and outermost ends thereof such that the keyways 182a and 182b extend in a circumferential direction of the inner hole 181. The cylindrical member 170 includes two protrusions 171 and 172 extending from an outer circumferential surface of the member such that the protrusions are aligned apart from each other along the axis of the cylindrical member 170.

The protrusions 171 and 172 are engaged with the groove 182, the cylindrical member 170 is inserted into the inner hole 181, and the cylindrical member 170 is rotated in the circumferential direction to engage the protrusions 171 and 172 with the keyways 182a and 182b, respectively. Then, the groove 182 is filled with a filler composed of an inorganic fiber laminate, this forming the burner tile 1G.

In the burner tile 1G, the cylindrical member 170 can be detached from the main body 180, and be repaired or replaced.

In this embodiment, the cylindrical member 170 has a tapered shape, or increases in diameter toward the furnace interior, and thus tends to move toward the furnace interior. The engagement of the two protrusions 171 and 172 and the keyways 182a and 182b prevents the movement of the cylindrical member 170 toward the furnace interior. Each of the number of protrusions and the number of keyways may be one or three or more. In addition, multiple grooves extending parallel to the axis may be arranged.

The groove 182 and the keyways 182a and 182b can be formed by cutting. The groove 182 and the keyways 182a and 182b may be formed by molding the outer layer using a mold with protrusions having the same dimensions as those of the groove and the keyways.

Figure 30:
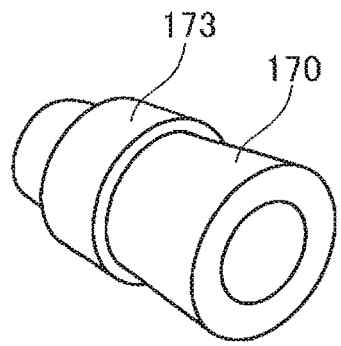
FIG. 30 is a perspective view illustrating a method of making a cylindrical member with protrusions.

To make the cylindrical member 170 having the protrusions 171 and 172, a cylindrical member having a raised circumferential rib 173 on the outer circumferential surface may be prepared as illustrated in FIG. 30. The raised circumferential rib 173 may be subjected to cutting, thus forming the protrusions 171 and 172.

Figure 31:
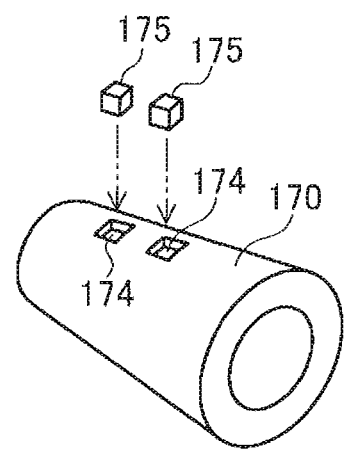
FIG. 31 is a perspective view illustrating a method of making a cylindrical member with protrusions.

The cylindrical member 170 having the protrusions can also be made in such a manner that, as illustrated in FIG. 31, recesses 174 are formed in the outer circumferential surface of the cylindrical member 170 and pieces 175 made of inorganic fiber are fitted into the recesses 174.

Figure 32:
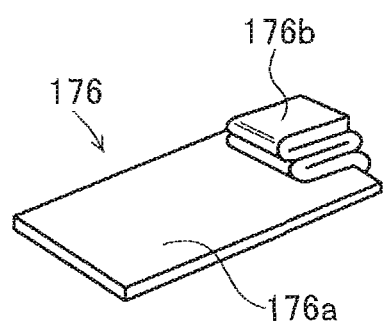
FIG. 32 is a perspective view illustrating a method of making a cylindrical member with protrusions.

The cylindrical member 170 having the protrusions can also be made using a band-shaped sheet 176, made of inorganic fiber, including a wide width portion 176a and a narrow width portion 176b in such a manner that, as illustrated in FIG. 32, the wide width portion 176a is bonded to the outer circumferential surface of the cylindrical member 170 with an inorganic adhesive and the narrow width portion 176b is folded in zigzag form and bonded to the wide width portion 176a with the inorganic adhesive.

In each of the burner tiles 1F and 1G, as in the above-described burner tiles 1 and 1E, when the burner tile is equally divided into three regions arranged concentrically about the axis of the main hole: the inner region 1a corresponding to the innermost third part closest to the main hole, the outer region 1c corresponding to the outermost third part, and the intermediate region 1b corresponding to the intermediate third part between the regions 1a and 1c, Di is greater than Dm where Di denotes the bulk density of part in the inner region 1a extending from the inner circumferential surface 3f of the main hole to the depth d=5 mm in the thickness direction, and Dm denotes the bulk density in the intermediate region 1b.

[Preferred Form of Inorganic Fiber Laminate]

The inorganic fiber laminate, serving as the rods 121 and 122 and the laminates 30, 31, and 131, is preferably, but not limited to, a component made in a manner described in Japanese Unexamined Patent Application Publication No. 2011-208344. The inorganic fiber laminate is preferably a needled inorganic fiber aggregate, such as a needled blanket subjected to needling, containing greater than or equal to 65 wt % alumina, more preferably a laminate of two or more different needled inorganic fiber aggregates.

The inorganic fiber included in the needled inorganic fiber aggregate is preferably alumina-based fiber containing greater than or equal to 65 wt % alumina. Examples of the inorganic fiber include single-component fiber comprising, for example, alumina/silica, zirconia containing them, spinel, or titania and composite fiber comprising these substances. From the viewpoints of heat resistance, fiber strength (tenacity), and safety, alumina/silica-based fiber is preferred, and polycrystalline alumina/silica-based fiber is more preferred.

The ratio (weight ratio) of alumina to silica of the alumina/silica-based fiber is preferably in the range of 65:35 (a mullite composition) to 98:2 (a high-alumina composition), more preferably 70:30 to 95:5, most preferably 70:30 to 74:26.

The inorganic fiber included in the needled blanket preferably comprises the above-described polycrystalline alumina/silica-based fiber having a mullite composition in an amount of 80 wt % or more, preferably 90 wt % or more, most preferably 100 wt %.

The inorganic fiber laminate constituting each of the rods 121 and 122 and the laminates 30, 31, and 131 preferably includes at least one of needled inorganic fiber aggregates A, B, C, and D, which will be described later. Each of the inorganic fiber laminates 31 and 131 preferably includes at least one of the needled inorganic fiber aggregates B and C. The inorganic fiber laminate may include a needled blanket of inorganic fiber containing less than or equal to 65 wt % alumina within the scope of the advantages of the present application.

[Needled Inorganic Fiber Aggregate A]

The needled inorganic fiber aggregate A has a needling density greater than or equal to 1.0 punches per square centimeter, preferably greater than or equal to 1.5 punches per square centimeter, and is less than 5.0 punches per square centimeter, preferably less than or equal to 3.0 punches per square centimeter. The needling density of the needled inorganic fiber aggregate A in this range is preferred because this allows the roll 132 to exhibit good deformability.

The needled inorganic fiber aggregate A has a bulk density of preferably 0.02 to 0.10 $g/cm^3$, more preferably 0.04 to 0.08 $g/cm^3$. The bulk density in this range is preferred because this ensures good handling in shaping the roll 132.

The needled inorganic fiber aggregate A has a surface density of 800 to 1400 $g/m^2$, more preferably 900 to 1300 $g/m^2$, most preferably 1000 to 1200 $g/m^2$. The surface density of the needled inorganic fiber aggregate A in this range is preferred because this ensures good handling in shaping the roll 132.

The thickness of the needled inorganic fiber aggregate A is not limited to particular values. Typically, the thickness is preferably approximately 35 to approximately 60 mm.

[Needled Inorganic Fiber Aggregate B]

The needled inorganic fiber aggregate B has a needling density greater than 5.0 punches per square centimeter, preferably greater than or equal to 6.0 punches per square centimeter, and is less than or equal to 10.0 punches per square centimeter, preferably less than or equal to 9.0 punches per square centimeter. The needling density in this range is preferred because this allows the burner tile to exhibit good shape-retainability and good deformability.

The needled inorganic fiber aggregate B has a bulk density of preferably 0.06 to 0.16 $g/cm^3$, more preferably 0.08 to 0.14 $g/cm^3$. The bulk density of the needled inorganic fiber aggregate B in this range is preferred because this allows the burner tile to have good shape-retainability.

The needled inorganic fiber aggregate B has a surface density of 2200 to 3600 $g/m^2$, more preferably 2300 to 3500 $g/m^2$, most preferably 2400 to 3200 $g/m^2$. The surface density in this range is preferred because this allows the burner tile to have good shape-retainability.

The thickness of the needled inorganic fiber aggregate B is not limited to particular values. Typically, the thickness is preferably approximately 20 to approximately 30 mm.

[Needled Inorganic Fiber Aggregate C]

The needled inorganic fiber aggregate C has a needling density greater than 10.0 punches per square centimeter, preferably greater than or equal to 12.0 punches per square centimeter, and is less than or equal to 17.0 punches per square centimeter, preferably less than or equal to 16.0 punches per square centimeter. The needling density in this range is preferred because this allows the burner tile to have good erosion resistance.

The needled inorganic fiber aggregate C has a bulk density of preferably 0.120 to 0.175 $g/cm^3$, more preferably 0.135 to 0.19 $g/cm^3$. The bulk density in this range is preferred because this allows the burner the to have good erosion resistance.

The needled inorganic fiber aggregate C has a surface density of 1000 to 2000 $g/m^2$, more preferably 1200 to 1800 $g/m^2$, most preferably 1400 to 1600 $g/m^2$. The surface density in this range is preferred because this allows the burner tile to have good erosion resistance.

The thickness of the needled inorganic fiber aggregate C is not limited to particular values. Typically, the thickness is preferably approximately 8.0 to approximately 12.0 mm.

[Needled Inorganic Fiber Aggregate D]

The needled inorganic fiber aggregate D has the same needling density and the same bulk density as those of the needled inorganic fiber aggregate D.

The needled inorganic fiber aggregate D has a surface density of preferably 1200 to 2000 $g/m^2$, more preferably 1300 to 1900 $g/m^2$, most preferably 1400 to 1800 $g/m^2$. The surface density in this range is preferred because this allows the burner tile inner cylinder including the rods 121 and 122 arranged circularly to have good shape-retainability for retaining the shape of the outer circumference of the cylinder.

The thickness of the needled inorganic fiber aggregate D is not limited to particular values. Typically, the thickness is preferably approximately 8 to approximately 15 mm.

In the burner tile according to the second invention, the roll that serves as the first inorganic fiber laminate 30 is preferably formed by wrapping a three-layer laminate mat including the needled inorganic fiber aggregate C, the needled inorganic fiber aggregate A, and the needled inorganic fiber aggregate B around the core mold 9, or alternatively, wrapping the needled inorganic fiber aggregates A, B, and C sequentially around the core mold 9. As regards the second inorganic fiber laminate 31, a two-layer laminate including the needled inorganic fiber aggregate A and the needled inorganic fiber aggregate B may be wrapped, or alternatively, the needled inorganic fiber aggregates A and B may be sequentially wrapped. Separate needled inorganic fiber aggregates can be easily sequentially wrapped around a core mold having a complicated shape.

In the burner tile according to the first invention, each of the rods 121 and 122 is preferably formed of the needled inorganic fiber aggregate B or D. In wrapping the roll including the rods 121 and 122 with the inorganic fiber laminate 131, the roll of the inorganic fiber laminate 131 is preferably formed by wrapping a two-layer laminate mat including the needled inorganic fiber aggregate A and the needled inorganic fiber aggregate B around the roll including the rods 121 and 122, or alternatively, wrapping the needled inorganic fiber aggregates A and B sequentially around the roll including the rods 121 and 122.

<Inorganic Binder>

An inorganic binder contained in the inorganic binder liquid is any compound that forms an oxide upon firing, for example, an inorganic sol, a metal salt, or a mixture of them. Although specific examples will be described below, the inorganic binder in the present invention is not limited to these examples.

Examples of the inorganic sol include an alumina sol, a zirconia sol, a titania sol, a magnesia sol, and a calcia sol. Examples of the metal salt include salts of the above-described metal species and organic acids, such formic acid, acetic acid, citric acid, oxalic acid, benzoic acid, and malic acid, and salts of the above-described metal species and mineral acids, such as nitric acid. Among them, an alumina sol is preferred because its thermal expansion coefficient is close to that of the inorganic fiber aggregate. A plurality of inorganic sols may be used as inorganic binders.

The solid content in the inorganic binder liquid is 6 to 14 wt %, preferably 8 to 11 wt %. Furthermore, the viscosity of the binder liquid is preferably adjusted to 5 to 200 cp.

From the viewpoint of the shape-retainability of the outside shape of the burner tile, preferably, the fixing rate of the inorganic binder in the outermost layer of each of the rolls 32 and 132 is greater than or equal to 1.0 times and less than or equal to 2.0 times that in the middle point between the outermost and innermost layers in the thickness direction thereof, and the fixing rate of the inorganic binder in the innermost layer of each roll is greater than or equal to 1.5 times and less than or equal to 10.0 times that in the middle point between the outermost and innermost layers in the thickness direction thereof. More preferably, the fixing rate in the outermost layer is greater than or equal to 1.1 times and less than or equal to 1.9 times that in the middle point, and the fixing rate in the innermost layer is greater than or equal to 3.0 times and less than or equal to 8.0 times that in the middle point.

The term "fixing rate of the inorganic binder" as used herein refers to the ratio of the weight of the solid content of the inorganic binder to the weight of the inorganic fiber expressed in percentage as follows.

(the fixing rate)=(the weight of the solid content of the inorganic binder)/(the weight of the inorganic fiber aggregate)×100

Examples of processes of measuring the fixing rate of the inorganic binder in the inorganic fiber include a firing process. Specifically, this rate can be measured by using a process disclosed in the known literature (International Publication No. NO 2013/035645).

The binder liquid may contain an additive, such as a dispersant, unless the advantages of the present invention are impaired.

<Mold Release Sheet>

The mold release sheet is not limited to particular materials. Examples of the mold release sheet include a synthetic resin sheet made of, for example, fluorocarbon resin, and glass cloth.

<Drying Conditions>

Drying conditions are not limited to particular conditions. Specifically, examples of drying include a process of applying hot air at 60° C. to 200° C. to the outermost layer and a process of leaving at rest in an atmosphere at 100° C. to 200° C. for approximately two to approximately five hours. Such a process is preferred because the process enables the amount of inorganic sol fixed in the outermost part to increase. Suction for liquid removal and drying may be performed simultaneously. This enhances the efficiency of operation.

<Firing Conditions>

Firing the compressed product can remove a volatile dispersant contained in the inorganic sol, reduce redispersion of the inorganic sol upon wetting with water or the like, and prevent the molded inorganic fiber product from collapsing due to redispersion. According to the present invention, it is preferred to fire at 600° to 1200° C. in an atmosphere containing oxygen, such as air, in which organic matter can completely disappear and a corundum structure of the inorganic binder, such as an alumina sol, can be formed.

<Post-Processing>

The burner tile according to the present invention may be subjected to post-processing as necessary. For example, the outer surface of the burner tile may be shaped into a specified form by cutting a burr with an NT cutter or the like.

EXAMPLES

The embodiments of the present invention will now be described by referring to the following Examples. These Examples are for illustrative purpose only, and should not be construed as limiting the present invention unless they depart from the spirit and scope of the invention. Items described in Examples were measured in the following manner.

[Bulk Density of High Bulk Density Part Facing Inner Circumferential Surface of Main Hole]

A ring-shaped piece was cut from the burner tile such that the piece had a thickness corresponding to a distance of 5 mm from the outermost surface of the inner wall of the main hole in the direction perpendicular to the flaming direction and has a thickness corresponding to a distance of 10 mm from the front end of the hole parallel to the flaming direction, and the piece was divided into four samples for measurement. The weight of each sample was measured. After that, Tough Dine (manufactured by Kubota-C.I. Co., Ltd.) was applied to the surface of the sample to make the surface hydrophobic. The sample was put into water in a graduated cylinder to measure the volume as an increase in water level. The bulk density of the high bulk density part was calculated by dividing the above-described weight by the volume.

[Bulk Densities in Intermediate and Outer Regions]

The procedure of measurement is as follows.

1) Samples (20 mm width×50 mm length×5 mm thickness) were cut from the burner tile.
2) Tough Dine (manufactured by Kubota-C.I. Co., Ltd.) was applied to the surface of each sample (in some cases, application was performed several times so that the surface had no pores, or was made completely smooth).
3) The samples were dried sufficiently.
4) The weight of each dried sample was measured.
5) The sample was put into water in a graduated cylinder to measure the volume as an increase in scale reading.
6) The bulk density [g/mL] was obtained by dividing the measured weight [g] by the measured volume [mL].

[Burner Combustion Test 1]

Burners having the following specifications were used, and combustion for five minutes and extinction were repeated ten times. Then, combustion was performed at a furnace temperature of 1400° C. in a test furnace for 32 hours.

Specifications of Burners:
1. Rectangular type (254 mm square×298 mm)
2. Cylindrical type (φ300 mm×218 mm)
Capacity: 1. 500000 kcal/h, 2. 600000 kcal/h
Fuel: 13 A town gas
Air temperature: 1. 400° C., 2. 400° C.
Fuel-air ratio: 1.0 to 1.1

[Concentric Accuracy]

The diameter of the opening of the main hole of the burner the adjacent to the furnace interior was measured with an inside caliper before and after the combustion test to determine the presence or absence of a change in radius.

[Presence or Absence of Peeling]

The inner circumferential surface of the main hole of the burner tile was visually observed before and after the combustion test to determine the presence or absence of peeling.

[Presence or Absence of Crack]

The burner tile was attached to a tip of a pipe, through which compressed air could be sent, such that a flame opening faced upward, and the opening of the main hole on the front side (adjacent to the furnace interior) was closed with a molded inorganic fiber product having a density of 0.170 g/=$^3$. After that, compressed air of 0.1 MPa was supplied into the burner tile from below. The outer surface of the burner tile was coated with bubbles of a detergent. The presence or absence of expansion of the bubbles was visually observed to determine the presence or absence of a crack.

[Presence or Absence of Surface Void]

The presence or absence of a surface void of the burner tile was visually observed before and after the firing step such that the opening of the main hole on the front side (adjacent to the furnace interior) was observed from the front side.

Example 1

The burner tile 1 was made using the core mold 9 shaped as illustrated in FIG. 6. The parts of the core mold 9 have the following dimensions.

The axial length of the front part 10: 192 mm
The maximum inside diameter of the front part 10: 122 mm
The minimum inside diameter of the front part 10: 85 mm
The axial length of the rear part 20: 106 mm
The maximum inside diameter of the rear part 20: 85 mm
The minimum inside diameter of the rear part 20: 61 mm

[Procedure of Making]

A needled alumina fiber blanket (MAFTEC (registered trademark) manufactured by Mitsubishi Plastics, Inc.), which will be referred to as a "needled blanket A" hereinafter, having a thickness of 50 mm and a needling density of 3.0 punches per square centimeter was cut into a piece having a width of 320 mm and a length of 2000 mm. A needled alumina fiber blanket (MAFTEC (registered trademark) 8P25T manufactured by Mitsubishi Plastics, Inc.), which will be referred to as a "needled blanket B" hereinafter, having a thickness of 25 mm and a needling density of 6.0 punches per square centimeter was cut into a piece having a width of 320 mm and a length of 2500 mm. In addition, a needled alumina fiber blanket (MAFTEC (registered trademark) manufactured by Mitsubishi Plastics, Inc.), which will be referred to as a "needled blanket C" hereinafter, having a thickness of 10 mm and a needling density of 12.0 punches per square centimeter was cut into a sector-shaped piece using a punch die such that a sector having a central angle of 55 degrees and a radius of 363 mm was cut from a sector having a central angle of 55 degrees and a radius of 520 mm. In addition, this fiber blanket was similarly cut into a sector-shaped piece such that a sector having a central angle of 65 degrees and a radius of 408 mm was cut from a sector having a central angle of 65 degrees and a radius of 565 mm.

As the mold release sheet, glass cloth (Chukoh Flo (registered trademark), G-type fabric, manufactured by Chukoh Chemical industries, Ltd.) having a thickness of 0.5 mm was wrapped one turn around the core mold 9. Then, the sector-shaped pieces of the needled blanket C were wrapped around part (front part 10) of the core mold such that the wrapped pieces served as part expected to be exposed to the harshest environment, or high-velocity air flow. Thus, the first inorganic fiber laminate 30 was formed. After that, the needled blanket A was superposed on the needled blanket B to form the second inorganic fiber laminate 31. The second inorganic fiber laminate 31 was wrapped as illustrated in FIG. 8, thus making the roll 32 having a diameter of 330 mm and a length of 320 mm.

The end plates 40 and 50 were attached to both end surfaces of the roll 32 as illustrated in FIG. 9, and the shaping plates were pressed against the roll 32 and were coupled to the end plates 40 and 50, thus forming a compressed prism-shaped product having a square cross-section with a length of 254 mm on each side.

This compressed product was immersed in an alumina sol (Alumina Sol 200 manufactured by Nissan Chemical industries, Ltd.) having a solid content of 8 wt % for 30 minutes, and then taken out. The liquid in the product was removed under a negative pressure of −17.5 to −22.5 kPa for 45 minutes. After that, the compressed product was surrounded by a box. While the compressed product was continuously subjected to suction, hot air at 100° C. to 140° C. was supplied into the box for four hours to dry the compressed product. After drying, the shaping plates were removed and the core mold 9 was also removed. Then, the resultant product was fired at 1000° C. in an air atmosphere for three hours, thus forming a burner tile base. After firing, burrs at four corners of the burner tile base were cut with a cutter. Then, the base was shaped with a band saw such that its outside shape was 254×254×298 mm. Furthermore, a pilot burner hole and a site hole were formed using a front panel for burner tile placement and a cork borer, thus making a burner tile as illustrated in Table 1.

Table 1 illustrates measurement results of characteristics of this burner tile. In the erosion test field of Table 1, Presence denotes the presence of a layer with observed erosion to a given depth and Absence denotes the absence of such erosion.

Example 2

A burner tile as illustrated in Table 1 was made in the same manner as in Example 1, except that the needled blanket C having a thickness of 12.5 mm was used instead of the needled blanket C having a thickness of 10.0 mm.

Example 3 (Cylindrical Burner Tile)

The above-described needled blanket A was cut into a piece having a width of 190 mm and a length of 600 mm, and the above-described needled blanket B was cut into a piece having a width of 240 mm and a length of 2500 mm. Furthermore, the needled blanket C was cut into a sector-shaped piece using a punch die such that a sector having a central angle of 250 degrees and a radius of 51 mm was cut from a sector having a central angle of 250 degrees and a radius of 112 mm. In addition, the needled blanket C was similarly cut into a sector-shaped piece such that a sector having a central angle of 65 degrees and a radius of 331 mm was cut from a sector having a central angle of 65 degrees and a radius of 461 mm. The cut needled blanket pieces were wrapped in the same order as that in Example 1. Two semicylindrical shaping plates were used. A burner tile as illustrated in Table 1 was made in the same manner as in Example 1, except for the above description.

Example 4 (Cylindrical Burner Tile)

A molded product having a diameter of φ100 mm about its axis was formed in the same manner as in Example 3, and then wrapped with the needled blanket B such that the total diameter was φ300 mm. The alumina sol was applied to the resultant product (by a drop-wise process) such that only part extending from the outer surface to a depth of 50 mm in the thickness direction was impregnated with the alumina sol, and then dried. A burner tile as illustrated in Table 1 was made in the same manner as in Example 3, except for the above description.

Example 5

A burner tile as illustrated in Table 1 was made in the same manner as in Example 1, except that the needled blanket A used in Example 1 was not used.

Example 6

A burner tile as illustrated in Table 1 was made in the same manner as in Example 1, except that a ceramic fiber blanket (the weight ratio of alumina to silica=48:52) made by a melting process was used instead of the needled blanket B used in Example 1.

Comparative Example 1

A burner tile as illustrated in Table 1 was made in the same manner as in Example 1, except that the impregnation with the inorganic sol (alumina sol) in Example 1 was omitted.

Comparative Example 2

A burner tile as illustrated in Table 1 was made by pouring a known silica-alumina-based castable material into a mold.

TABLE 1

| | | Size (mm) | | Concentric accuracy | Burner combustion test | | | Bulk density (g/cm$^3$) | | | |
| --- | --- | --- | --- | --- | --- | --- | --- | --- | --- | --- | --- |
| | | | | | Presence or absence of peeling (relating to erosion resistance) | Presence or absence of crack (relating to thermal shock resistance) | Presence or absence of surface void (relating to heat shrinkage resistance) | | | | |
| | Shape | Front | Length | | | | | $D_i$ | $D_m$ | $D_o$ | $D_m/D_i$ |
| Example 1 | Cuboid | 254 × 254 | 298 | Not changed | Absence | Absence | Absence | 0.64 | 0.24 | 0.35 | 0.375 |
| Example 2 | Cuboid | 190 × 190 | 228 | Not changed | Absence | Absence | Absence | 0.40 | 0.22 | 0.28 | 0.550 |
| Example 3 | Cylinder | φ 300 | 218 | Not changed | Absence | Absence | Absence | 0.68 | 0.26 | 0.38 | 0.375 |
| Example 4 | Cylinder | φ 300 | 218 | Not changed | Absence | Absence | Absence | 0.66 | 0.13 | 0.36 | 0.197 |
| Example 5 | Cuboid | 254 × 254 | 298 | Not changed | Absence | Absence | Presence | 0.65 | 0.23 | 0.35 | 0.375 |
| Example 6 | Cuboid | 254 × 254 | 298 | Not changed | Absence | Absence | Presence | 0.67 | 0.24 | 0.35 | 0.375 |
| Comparative Example 1 | Cuboid | 254 × 254 | 298 | Offset by 3 mm | Presence | Absence | Absence | 0.15 | 0.16 | 0.15 | 1.067 |
| Comparative Example 2 | Cuboid | 254 × 254 | 298 | Not changed | Presence | Presence | — | 2.9 | 2.9 | 2.9 | 1.000 |

As illustrated in Table 1, each of the burner tiles of Examples exhibits excellent erosion resistance and excellent thermal shock resistance. Among them, the burner tiles of Examples 1 to 4 including the three specific kinds of blankets have excellent erosion resistance, excellent thermal shock resistance, low heat shrinkage, and excellent formability for good appearance. Disposing the needled blanket C having a robust structure achieved by self-needling as the innermost wall increases the erosion resistance. Furthermore, disposing the needled blanket A, serving as a semi-bulk product, between the layers reduces the resilience of the fiber aggregate, or increases the formability. In addition, a molded matrix formed of the needled blankets A and B with highly crystallized mullite compositions in the fiber barely shrinks when heated.

Example 7

The burner tile 1E was made using the core mold 109 shaped as illustrated in FIG. 22*a*. The parts of the core mold 109 have the following dimensions.

The axial length of the front part 10: 276 mm
The maximum inside diameter of the front part 10: 140 mm
The minimum inside diameter of the front part 10: 140 mm
The axial length of the rear part 20: 237 mm
The maximum inside diameter of the rear part 20: 118 mm
The minimum inside diameter of the rear part 20: 71 mm
[Procedure of Making]

A needled alumina fiber blanket (MAFTEC (registered trademark) manufactured by Mitsubishi Plastics, Inc.), which will be referred to as a "needled blanket A" hereinafter, having a thickness of 50 mm and a needling density of 3.0 punches per square centimeter was cut into a piece having a width of 320 mm and a length of 2500 mm. A needled alumina fiber blanket (MAFTEC (registered trademark) 8P25T manufactured by Mitsubishi Plastics, Inc.), which will be referred to as a "needled blanket B" hereinafter, having a thickness of 25 mm and a needling density of 6.0 punches per square centimeter was cut into a piece having a width of 533 mm and a length of 3200 mm.

As the mold release sheet, glass cloth (Chukoh Flo (registered trademark), G-type fabric, manufactured by Chukoh Chemical Industries, Ltd.) having a thickness of 0.5 mm was wrapped one turn around the core mold. Then, the blanket B was cut into rods. A needled alumina fiber blanket (MAFTEC (registered trademark) 8P12.5T manufactured by Mitsubishi Plastics, Inc.), which will be referred to as a "needled blanket D" hereinafter, having a thickness of 12.5 mm and a needling density of 6.0 punches per square centimeter was cut into triangular pyramids. One rod and one triangular pyramid were combined and fixed into a module, and 23 modules were circularly arranged to form part expected to be exposed to the harshest environment, or high-velocity air flow. The modules arranged circularly were compressed using an auxiliary tool, such as a fastening rope, such that the compressibility was 25%, thus forming the inner layer.

After that, the needled blanket A was superposed on the needled blanket B to form the second inorganic fiber laminate 131. As illustrated in FIG. 24, the second inorganic fiber laminate 131 was wrapped around the inner layer formed in the above-described manner, this making the roll 132 having a diameter of 460 mm and a length of 533 mm.

The end plates 40 and 50 were attached to both end surfaces of the roll 132 as illustrated in FIG. 25. Then, the shaping plates were pressed against the roll 132 and were coupled to the end plates 40 and 50, thus forming a compressed prism-shaped product having a square cross-section with a length of 323 mm on each side.

This compressed product was immersed in an alumina sol (Alumina Sol 200 manufactured by Nissan Chemical Industries, Ltd.) having a solid content of 8 wt % for three hours, and then taken out. The liquid in the product was removed under a negative pressure of −25.0 to −30.0 kPa for 100 minutes. After that, the compressed product was surrounded by a box. While the compressed product was continuously subjected to suction, hot air at 100° C. to 140° C. was supplied into the box for 12 hours to dry the compressed product. After drying, the shaping plates were removed and the core mold 109 was also removed. Then, the resultant product was fired at 1000° C. in an air atmosphere for three hours, thus forming a burner tile base. After firing, burrs at four corners of the burner tile base were cut with a cutter. Then, the base was shaped with a band saw such that its outside shape was 323 mm×323 mm×513 mm. Furthermore, a pilot burner hole and a site hole were formed using a front panel for burner tile placement and a cork borer, this making a burner tile as illustrated in Table 2. The obtained burner tile was subjected to physical property tests (a falling ball impact test and a thermal shock resistance test) and burner combustion tests 1 and 2 (the presence or absence of peeling of the inner wall and the presence or absence of a crack after the tests). Table 2 illustrates the test results. The physical property tests and the burner combustion test were performed under the following conditions.

[Falling Ball Impact Strength]

A steel ball having a weight of 550 g was dropped from a height of 1 m on a central portion of a side surface of the final product to observe its appearance (breakage) thereof.

[Thermal Shock Resistance Test]

The obtained burner tile was cut along a plane including the axis of a furnace core into a sample having a predetermined size. The sample was left at rest in an electric furnace heated at 1500° C. for 15 minutes. After that, the sample was taken out of the electric furnace and left at rest in the air for 15 minutes. Such an operation was repeated ten times. After that, the appearance of the sample was observed with respect to, for example, peeling and cracks. The open circle denotes the presence of a crack having a depth or width of 10 mm or more and peeling. The cross denotes the absence of them.

[Burner Combustion Test 2]

A burner having the following specification was used, and combustion for five minutes and extinction were repeated ten times. Then, combustion was performed at a furnace temperature of 1350° C. in a test furnace for 720 hours.

Specification of Burner:
Type: Rectangular type (323 mm square×513 mm)
Capacity: 850000 kcal/h
Fuel: 13 A town gas
Air temperature: 400° C.
Fuel-air ratio: 1.0 to 1.1

Evaluation (observation of the inner wall) after the burner combustion tests 1 and 2 was performed as follows.

The inner circumferential surface of the main hole of the burner tile was visually observed before and after the combustion test to determine the presence or absence of peeling. If any visible local erosion in the depth direction or any peeling in the direction along the inner wall was not observed, it was determined that the inner wall was in good condition. If any erosion or peeling was observed, it was determined that the inner wall was in bad condition.

Comparative Example 3

An inner cylinder was made by pouring a known silica-alumina-based castable material into a mold. After that, the inner cylinder was wrapped with the blanket A, and the upper, lower, right, left, front, and rear surfaces of the inner cylinder were surrounded by a vacuum-formed molded product, thus making a burner tile as illustrated in Table 2. The burner tile made in the above-described manner was subjected to the physical property tests and the burner combustion tests and evaluated in the same manner as in Example 7. Table 2 illustrates the results.

Comparative Example 4

The blanket B was cut into 12 square pieces having a length of 300 mm on each side, the alumina sol was applied between the square pieces of the blanket B, and the square pieces were bonded together to form a module. In addition, two molded inorganic fiber products having the same size as that of the above-described square piece were made by immersing pieces of the blanket B in the alumina sol and drying them. After that, the alumina sol was applied to the module and the molded inorganic fiber products such that the alumina sol was interposed between the module and each of the molded products sandwiching the module therebetween, and the module and the molded products were compressed by 20%, thus forming an inorganic fiber block. The inorganic fiber block was machined with a milling machine to form a cylindrical inner hole for combustion having the same size as that in Example 7, thus making a burner tile as illustrated in Table 2. The burner tile made in the above-described manner was subjected to the physical property tests and the burner combustion tests and evaluated in the same manner as in Example 7. Table 2 illustrates the results.

Comparative Example 5

A burner tile was made using the core mold 109.
The parts of the core mold 109 have the following dimensions.
The axial length of the front part 10: 276 mm
The maximum inside diameter of the front part 10: 140 mm
The minimum inside diameter of the front part 10: 140 mm
The axial length of the rear part 20: 237 mm
The maximum inside diameter of the rear part 20: 118 mm
The minimum inside diameter of the rear part 20: 71 mm
[Procedure of Making]
As the mold release sheet, glass cloth (Chukoh Flo (registered trademark), G-type fabric, manufactured by Chukoh Chemical Industries, Ltd.) having a thickness of 0.5 mm was wrapped one turn around the core mold. Then, a needled alumina fiber blanket (MAFTEC (registered trademark) 8P25T manufactured by Mitsubishi Plastics, Inc.), which will be referred to as a "needled blanket B" hereinafter, having a thickness of 25 mm and a needling density of 6.0 punches per square centimeter was cut into rods. As part expected to be exposed to the harshest environment, or high-velocity air flow, thirty-four modules each including two rods of the needled blanket B were circularly arranged. The modules arranged circularly were combined and compressed using an auxiliary tool, such as a fastening rope, such that the compressibility was 25%, thus forming the inner layer.
Then, the needled blanket B was cut into eight pieces each having a width of 161.5 mm and a length of 513 mm. The eight pieces of the needled blanket were fixed and compressed to a thickness of 161.5 mm, thus making a block. Four blocks made in the above-described manner were arranged such that the piece arrangement direction of each block was perpendicular to that of the next block, thus forming a prism-shaped block assembly having a square cross-section with a length of 323 mm on each side. The prism-shaped block assembly was machined such that the inner layer was received in central part the block assembly. After that, the four blocks surrounding the inner layer and constituting the prism-shaped block assembly were fixed from the outside, thus making a prism-shaped block assembly including the inner layer and having a square cross-section with a length of 323 mm on each side. A pilot burner hole and a site hole were formed using a front panel for burner tile placement and a cork borer, thus making a burner tile as illustrated in Table 2 The obtained burner tile was subjected to the physical property tests (the falling ball impact test and the thermal shock resistance test) and the burner combustion tests 1 and 2 (the presence or absence of peeling of the inner wall and the presence or absence of a crack after the tests). Table 2 illustrates the results.

Comparative Example 6

A burner tile as illustrated in Table 2 was made in the same manner as in Comparative Example 4, except that the procedure further included applying the alumina sol to the formed cylindrical inner hole for combustion (by brush painting) such that part extending from the surface of the cylindrical inner hole to a depth of approximately 5 mm in the thickness direction was impregnated with the alumina sol. The obtained burner tile was subjected to the physical property tests (the falling ball impact test and the thermal shock resistance test) and the burner combustion tests 1 and 2 (the presence or absence of peeling of the inner wall and the presence or absence of a crack after the tests). Table 2 illustrates the results.

TABLE 2

| | | | | Physical property tests | | Burner combustion tests | | | | | |
|---|---|---|---|---|---|---|---|---|---|---|---|
| | | Size (mm) | | Falling ball impact | Thermal shock resistance test (1500° C. * 15 min × 10 times) | 1 (1400° C. × 32 h) Inner wall observation | 2 (1350° C. × 720 h) Inner wall observation | Bulk density (g/cm³) | | | |
| | Shape | Front | Length | strength | | | | $D_i$ | $D_m$ | $D_o$ | $D_m/D_i$ |
| Example 7 | Cuboid | 323 × 323 | 513 | Not changed | ○ | Good | Good | 0.34 | 0.24 | 0.35 | 0.71 |
| Comparative Example 3 | Cuboid | 323 × 323 | 513 | Crack | ○ | Good | Bad | 2.50 | 0.14 | 0.30 | 0.06 |
| Comparative Example 4 | Cuboid | 323 × 323 | 513 | Not changed | X | Bad | Bad | 0.13 | 0.13 | 0.13 | 1.00 |
| Comparative Example 5 | Cuboid | 323 × 323 | 513 | Not changed | ○ | Bad | Bad | 0.16 | 0.14 | 0.13 | 1.08 |
| Comparative Example 6 | Cuboid | 323 × 323 | 513 | Not changed | X | Good | Bad | 0.30 | 0.13 | 0.13 | 0.43 |

As illustrated in Table 2, the burner tile according to Example exhibits excellent erosion resistance and excellent thermal shock resistance. Table 2 demonstrates that the burner tile according to Example 7 has excellent erosion resistance, excellent thermal shock resistance, low heat shrinkage, and excellent formability for good appearance. The burner tile according to Example 7 includes the inner layer surrounding the main hole and the outer layer surrounding the outer circumferential surface of the inner layer, the inner layer includes the inorganic fiber rods combined and compressed with a predetermined compressibility such that end surfaces of the rods extend radially from the main hole, and the outer layer includes the inorganic fiber blanket wrapped several turns around the outer circumferential surface of the inner layer.

Although the present invention has been described in detail with reference to particular embodiments, it will be apparent to those skilled in the art that various modifications are possible without departing from the spirit and scope of the present invention.

The present application is based on Japanese Patent Application No. 2014-024487 filed on Feb. 12, 2014 and No. 2015-001634 filed on Jan. 7, 2015, which are hereby incorporated by reference herein in their entirety.

REFERENCE SIGNS LIST 1, 1A to 1F, 100 burner tile
3, 3E main hole
3f inner circumferential surface of main hole
4 high bulk density part
9, 109 core mold
10, 110 front part
20, 111 rear part
31, 131 inorganic fiber laminate
32, 132 roll
40, 50 end plate
80 furnace
82 burner
120, 150 inner layer
121, 122 rod formed of inorganic fiber laminate
130, 160 outer layer

The invention claimed is:

1. A burner tile including a molded inorganic fiber product and having a burner main hole extending therethrough in a furnace interior-exterior direction, the burner tile comprising:
an inner layer surrounding the main hole and an outer layer surrounding an outer circumferential surface of the inner layer, the inner layer and the outer layer being included in at least part of the burner tile adjacent to a furnace interior,
the inner layer including inorganic fiber rods arranged and combined such that end surfaces of the rods extend substantially radially from the main hole,
the outer layer including a laminate wrapped several turns around the outer circumferential surface of the inner layer,
wherein the laminate is formed by a plurality of superposed inorganic fiber blankets having different bulk densities.

2. The burner tile according to claim 1, wherein the bulk density of the burner tile decreases in a radially outward direction.

3. The burner tile according to claim 1,
wherein the inner layer is included in only the part of the burner tile adjacent to the furnace interior, and
wherein the outer layer defines an inner circumferential surface of the main hole in part of the burner tile adjacent to a furnace exterior.

4. The burner tile according to claim 1, wherein the percentage of $T_1/T_0$ is 20% to 70% where $T_0$ denotes the thickness of the burner tile and $T_1$ denotes the average thickness of the inner layer in a cross-section in which the burner tile has a minimum thickness in its radial direction relative to the axis of the main hole.

5. The burner tile according to claim 1, wherein the inorganic fiber rods included in the inner layer include rods having a triangular or trapezoidal cross-section perpendicular to the axis of the main hole and rods having a rectangular cross-section perpendicular to the axis of the main hole.

6. The burner tile according to claim 1, wherein the burner tile is shaped so as to have a square outside shape in a cross-section perpendicular to the axis of the main hole.

7. The burner tile according to claim 1, wherein part of the burner tile extending along an inner circumferential surface of the main hole has a bulk density of 0.3 to 1.0 $g/cm^3$.

8. The burner tile according to claim 7, wherein the burner tile includes inorganic fibers and a binder-derived material caused by oxidation of an inorganic binder binding the inorganic fibers, and the amount of the binder-derived material per unit volume in the part extending along the inner circumferential surface of the main hole is greater than that in the intermediate region.

9. The burner tile according to claim 1, wherein Di-Dm is 0.05 to 3.0 $g/cm^3$ where Di denotes a bulk density of part extending from an inner circumferential surface of the main hole to a depth of 5 mm and Dm denotes a bulk density in an intermediate region when a cross-section of the burner tile perpendicular to the axis of the main hole is equally divided into three regions that are an inner region adjacent to the main hole, an outer region adjacent to an outer surface of the burner tile, and the intermediate region between the inner and outer regions.

10. The burner tile according to claim 9, wherein Dm/Di is 0.1 to 0.9.

11. The burner tile according to claim 1, wherein the inorganic fiber is alumina-based fiber.

12. The burner tile according to claim 11, wherein the alumina-based fiber is crystalline alumina silica fiber containing greater than or equal to 65 wt % alumina.

13. The burner tile according to claim 1,
wherein the burner tile is composed of a cylindrical member fitted in part of an inner circumferential surface of the main hole adjacent to the furnace interior and a main body in which the cylindrical member is detachably fitted, and
wherein the burner tile further includes a protrusion that prevents the cylindrical member from separating from the main body and moving toward the furnace interior.

14. A burner comprising the burner tile according to claim 1.

15. A furnace comprising the burner according to claim 14.

16. A method for producing the burner tile according to claim 1, the method comprising:
arranging inorganic fiber rods on at least part of a core mold having a shape of the main hole adjacent to a furnace interior whereby end surfaces of the rods extend radially;
wrapping an inorganic fiber laminate around at least outer surfaces of the rods to form an inorganic fiber roll;
compressing by pressing shaping plates against an outer surface of the inorganic fiber roll toward the center of the roll to compress the roll, and coupling the shaping plates to the core mold to maintain the compressed inorganic fiber roll as a compressed product;
impregnating the compressed product in an inorganic-binder-containing liquid;
drying the compressed product impregnated with the inorganic-binder-containing liquid;
releasing by removing the core mold and the shaping plates from the dried compressed product; and
firing the compressed product after removal.

17. The method for producing a burner tile according to claim 16, wherein the core mold and the shaping plates have holes for passing the inorganic-binder-containing liquid therethrough.

18. The method for producing a burner tile according to claim 17, wherein the method further comprises sucking part of the inorganic-binder-containing liquid held in the compressed product through the core mold.

19. A burner tile including a molded inorganic fiber product and having a burner main hole extending therethrough in a furnace interior-exterior direction, the burner tile comprising:
- high bulk density part that extends along an inner circumferential surface of the main hole and has a higher bulk density than intermediate part located between the inner circumferential surface and an outer surface of the burner tile,
- wherein the burner tile includes an outer part formed by rolling a plurality of superposed inorganic fiber blankets having different bulk densities several turns.

* * * * *